(12) United States Patent
Ucar et al.

(10) Patent No.: US 12,330,658 B2
(45) Date of Patent: Jun. 17, 2025

(54) IDENTIFYING AN ORIGIN OF ABNORMAL DRIVING BEHAVIOR FOR IMPROVED VEHICLE OPERATION

(71) Applicant: Toyota Motor Engineering & Manufacturing North America, Inc., Plano, TX (US)

(72) Inventors: Seyhan Ucar, Mountain View, CA (US); Ryan Mercer, Mountain View, CA (US)

(*) Notice: Subject to any disclaimer, the term of this patent is extended or adjusted under 35 U.S.C. 154(b) by 341 days.

(21) Appl. No.: 17/235,607

(22) Filed: Apr. 20, 2021

(65) Prior Publication Data

US 2022/0332324 A1    Oct. 20, 2022

(51) Int. Cl.
*B60W 40/09* (2012.01)
*B60W 40/08* (2012.01)
*B60W 50/08* (2020.01)

(52) U.S. Cl.
CPC .......... *B60W 40/09* (2013.01); *B60W 50/08* (2013.01); *B60W 2040/0809* (2013.01); *B60W 2540/22* (2013.01); *B60W 2540/229* (2020.02)

(58) Field of Classification Search
CPC .............. B60W 40/09; B60W 50/08; B60W 2040/0809; B60W 2540/22; B60W 2540/229; B60W 2540/30
See application file for complete search history.

(56) References Cited

U.S. PATENT DOCUMENTS

| | | |
|---|---|---|
| 6,438,472 B1 | 8/2002 | Tano et al. |
| 10,297,148 B2 | 5/2019 | Sumers |
| 10,414,407 B1 | 9/2019 | Slusar |
| 2007/0233438 A1 | 10/2007 | Quimper et al. |
| 2016/0307285 A1 | 10/2016 | Gallagher |
| 2018/0009442 A1 | 1/2018 | Spasojevic et al. |
| 2018/0281784 A1* | 10/2018 | Huang ............... B60W 40/08 |
| 2019/0038204 A1 | 2/2019 | Beck et al. |
| 2019/0102689 A1 | 4/2019 | Lassoued et al. |
| 2019/0111933 A1* | 4/2019 | Schoeggl .......... B60W 60/0011 |
| 2019/0286133 A1* | 9/2019 | Bielby ............... B60W 50/085 |

(Continued)

FOREIGN PATENT DOCUMENTS

| CN | 110807436 | 2/2020 |
|---|---|---|
| JP | 5510736 | 6/2014 |

OTHER PUBLICATIONS

Meiring, et al., "A review of intelligent driving style analysis systems and related artificial intelligence algorithms," Sensors 2015, 15(12), Dec. 4, 2015, 30 pages.

*Primary Examiner* — Ig T An
*Assistant Examiner* — Christine Nguyen Huynh
(74) *Attorney, Agent, or Firm* — Burbage Law, P.C.; Jon-Michael Burbage

(57) ABSTRACT

The disclosure includes embodiments for identifying an origin of abnormal driving behavior for improved vehicle operation. A method includes identifying an abnormal driving behavior of a driver of a vehicle at a time T. The method includes identifying a set of events that occurred within a predetermined time Δt before time T. The method includes executing, by a processor, a cause-and-effect analysis on the set of events to determine one or more events from the set of events that caused the abnormal driving behavior. The method includes executing a strategy to reduce the abnormal driving behavior so that vehicle operation is improved.

20 Claims, 7 Drawing Sheets

(56) References Cited

U.S. PATENT DOCUMENTS

| | | |
|---|---|---|
| 2020/0183769 A1 | 6/2020 | Poghosyan et al. |
| 2020/0216027 A1* | 7/2020 | Deng .................. H04L 63/1416 |
| 2020/0216080 A1 | 7/2020 | Soltanian et al. |
| 2020/0380354 A1* | 12/2020 | Zhao ...................... G06N 3/044 |
| 2021/0074154 A1* | 3/2021 | Ucar ................ G08G 1/096725 |
| 2022/0289131 A1* | 9/2022 | Ito ....................... B60R 21/0132 |

* cited by examiner

IDENTIFYING AN ORIGIN OF ABNORMAL DRIVING BEHAVIOR FOR IMPROVED VEHICLE OPERATION

BACKGROUND

The specification relates to identifying an origin of abnormal driving behavior for improved vehicle operation.

Drivers of vehicles sometimes drive abnormally for various reasons. For example, the driver may be experiencing from one or more of the following conditions which contributes to their driving their vehicle abnormally: fatigue; poor vision; driving in inclement weather; driving at night; distraction; alcohol consumption; drug use; inexperience; diminished capacity; medical treatment; medical condition; any condition that is related to, or a derivative of, the conditions previously listed; etc.

Sometimes a vehicle is driven abnormally because it needs repair or maintenance. For example, the vehicle may have one or more of the following conditions: a flat tire; incorrect air pressure in a tire; a broken or uncalibrated sensor; low fluid; a fluid leak; a fault with the vehicle breaking system; a fault with the vehicle fuel injection system; a fault with the vehicle power steering system; a fault with a vehicle control system; a fault with a vehicle computer or sensor; a fault with the vehicle electrical system; a loose belt or chain; damage to a body panel or some other portion of the vehicle; an onboard vehicle computer that needs a software update; or any other condition or combination of conditions which adversely affects the operation of the vehicle and is capable of correction by repair of one or more vehicle parts, replacement of one or more vehicle parts, or maintenance to one or more vehicle parts.

Modern vehicles broadcast V2X messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." Other types of vehicle control systems are possible. A vehicle control system includes code and routines, and optionally hardware, that are operable to control the operation of some or all of the systems of a vehicle.

A particular vehicle that includes these vehicle applications is referred to herein as an "ego vehicle" and other vehicles in the vicinity of the ego vehicle are referred to as "remote connected vehicles."

SUMMARY

A problem is that some of the vehicles that operate on the roadways display abnormal driving behavior. Existing solutions to this problem focus on detecting abnormal driving behavior and initiating management systems that attempt to minimize the risk caused by the abnormal driving behavior by addressing the harm or risk caused by the abnormal driving behavior; this focus on addressing the harm or risk caused by the abnormal driving behavior is the critical focus of these existing solutions. For example, if a vehicle is swerving outside of their lane of travel, the existing solutions temporarily take control of the steering of the vehicle and recenter the vehicle inside its own lane of travel. Some existing solutions do not take control of the vehicle which is being driven abnormally, and instead provide a notification of the abnormal driving to the driver of the vehicle which may or may not be accompanied by a suggestion for how to correct the problem. Some existing solutions use cellular communications to notify other vehicles about the abnormal driving behavior.

The problem with these existing solutions is that the abnormal driving behavior inevitably returns and introduces avoidable risk into the operating environment of vehicles. This is a potentially fatal mistake. For example, consider the example given above. It is good that the existing solutions are able to detect that a vehicle is swerving outside of its lane of travel and takes steps to center the vehicle in its own lane of travel. However, for some period of time the vehicle is still driving outside of its lane of travel, and this is extremely dangerous. What is needed is an approach that makes it less likely that the vehicle will be driven abnormally in the first place.

Described herein are embodiments of an origin system. The origin system is different from the existing solutions for various reasons. For example, the origin system does not focus on addressing the harm or risk caused by the abnormal driving behavior is the critical focus of these existing solutions; instead, the origin system focuses on determining the origin, or root cause, of a driver's abnormal driving behavior and then takes steps to ensure that this root cause is eliminated from the driver's driving experience in the future. In this way, the origin system beneficially makes it less likely that vehicles are driven abnormally repeatedly in the same way for the same reasons. A non-limiting example is now provided.

For example, a driver of a vehicle swerves outside of their lane of travel whenever they receive a phone call on their cellular phone. The origin system described herein determines that the driver is swerving outside of their lane of travel and that the origin of this abnormal driving behavior is that the driver swerves outside of their lane of travel whenever they receive a phone call while operating their vehicle. The origin system therefore takes steps to ensure that the driver is not able to receive phone calls in the future. For example, the driver's cellular phone has a client stored therein which operates in cooperation with the origin system. The origin system communicates with this client to cause the cellular phone to implement a strategy such as one or more of the following: turn off its communication radios whenever the vehicle is traveling; place the phone in "do not disturb" mode so that the driver is not made aware of the phone call which is then redirected to voicemail; place the phone is "silent" mode so that the phone does not provide the driver with a notification of the phone call; redirect all received phone calls to voicemail and provide the driver with a silent notification of the phone call; and any other strategy which achieves the result of the driver being unable to receive the phone call while they are driving the vehicle. The origin system then updates the profile data of the driver with profile update data that describes, among other things, the strategy which is implemented to correct/remove the abnormal driving behavior. The profile data is stored in a database or some other data structure so that the strategy is implemented by the origin system of this vehicle, and/or other vehicles having an origin system, in the future. In this way the origin system beneficially determines the origin of a driver's abnormal behavior and implements a strategy which is operable to remove the origin from the current and future driving experiences of the driver so that the abnormal driving behavior does not occur in the future responsive to the same origin occurring.

In some embodiments, the profile data of the driver includes digital that describes one or more of the following: a unique identifier of the driver; a list of the geographic locations that they have driven at in the past; a list of their past abnormal driving behaviors; a list of the origins of their past abnormal driving behaviors; a list of the strategies which were implemented to remove these abnormal driving behaviors; and a list of the strategies for correcting abnormal driving behavior which has been approved by the driver. An example of the profile data according to some embodiments includes the profile data 183 depicted in FIG. 1.

The profile update data includes digital data that describes one or more of the following: (1) the origin of the abnormal driving behavior, (2) the abnormal driving behavior itself, and (3) the strategy which is implemented to remove the origin of the abnormal driving behavior. An example of the profile update data according to some embodiments includes the profile update data 172 depicted in FIG. 1.

In some embodiments, the strategies implemented by the origin system are required to be pre-approved by a human prior to their implementation by the origin system. For example, in some embodiments the strategies are pre-approved by the driver of the vehicle prior to their implementation (e.g., so that their implementation does not frighten, anger, confuse, surprise, or otherwise affect the driver in an unexpected way). In some embodiments, the strategies are pre-approved by an engineer that designed the origin system. In some embodiments, the strategies are pre-approved by the both the driver and the engineer.

In some embodiments, the strategies are selected from a dataset of approved strategies that are designed by the engineer to counteract a known set of abnormal driving behaviors. In this way the strategies are known to be effective at eliminating the abnormal driving behavior. In some embodiments, the strategies are determined based at least in part on the execution of one or more digital twin simulations. Digital twin simulations are described in more detail below. Digital twin data includes any digital data, software, and/or other information that is necessary to execute the digital twin simulations. An example of the digital twin data according to some embodiments includes the digital twin data 162 depicted in FIG. 1.

In one embodiment, the origin system identifies abnormal driving behavior as one or more of the following: behavior which is within a set of known abnormal driving behavior (e.g., based on real-world or simulated observations of behavior that are result in negative outcomes or impact); behavior which satisfies a threshold for matching an object prior of abnormal driving behavior; and behavior which satisfies a threshold for abnormality. Threshold data includes digital data that describes any of the threshold described herein. An example of the threshold data according to some embodiments includes the threshold data 196 depicted in FIG. 1. Reference data includes digital data that describes one or more of the known abnormal driving behaviors and the object priors described herein. An example of the reference data according to some embodiments includes the reference data 188 depicted in FIG. 1.

In some embodiments, the strategies are implemented by a vehicle control system and/or a client which is stored on a processor-based computing device of the driver such as a smartphone, cellular phone, smartwatch, smart glasses, or some other processor-based computing device.

Examples of the embodiments are now described. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for identifying an origin of abnormal driving behavior for improved vehicle operation. The method also includes identifying an abnormal driving behavior of a driver of a vehicle at a time t; identifying a set of events that occurred within a predetermined time Δt before time t; executing, by a processor, a cause-and-effect analysis on the set of events to determine one or more events from the set of events that caused the abnormal driving behavior; and executing a strategy to reduce the abnormal driving behavior so that vehicle operation is improved. Other embodiments of this aspect include corresponding computer systems, apparatus, and computer programs recorded on one or more computer storage devices, each configured to perform the actions of the methods.

Implementations may include one or more of the following features. The method where the strategy is selected from a set of pre-approved strategies based on a type of the abnormal driving behavior so that the strategy is customized for the type. The set of pre-approved strategies is pre-approved by the driver of the vehicle. The pre-approval occurs prior to the driver operating the vehicle. The pre-approval is stored in a trip profile which the driver creates each time they operate the vehicle. The pre-approval is stored in a user profile associated with the driver and the user profile is accessible via a plurality of vehicles so that the user profile of the driver is usable by the driver when operating any of the plurality of vehicles. The set of pre-approved strategies is pre-approved by an engineer of the vehicle. The strategy is selected based on the execution of a set of digital twin simulations. The abnormal driving behavior is identified based at least in part on the execution of a set of digital twin simulations. The method is executed by onboard vehicle computers of one or more vehicles that are members of a vehicular micro cloud. The vehicular micro cloud does not include use of cellular communications. The method is executed at least in part by a hardware server. The strategy is executed by a vehicle control system of the vehicle. The strategy is executed by a plurality of vehicle control systems of a plurality of vehicles that are members of a vehicular micro cloud. The vehicular micro cloud is formed responsive to identifying the abnormal driving behavior by the method. Implementations of the described techniques may include hardware, a method or process, or computer software on a computer-accessible medium.

One general aspect includes a system including a non-transitory memory; a vehicle control system; and a processor communicatively coupled to the non-transitory memory and the vehicle control system, where the non-transitory memory stores computer readable code that is operable, when executed by the processor, to cause the processor to execute steps including: identifying an abnormal driving behavior of a driver of a vehicle at a time t; identifying a set of events that occurred within a predetermined time Δt before time t; executing, by a processor, a cause-and-effect analysis on the set of events to determine one or more events from the set of events that caused the abnormal driving behavior; and executing a strategy, by the vehicle control system, to reduce the abnormal driving behavior so that vehicle operation is improved. Other embodiments of this aspect include corresponding computer systems, apparatus, and computer programs recorded on one or more computer storage devices, each configured to perform the actions of the methods.

Implementations may include one or more of the following features. The system where the strategy is selected from a set of pre-approved strategies based on a type of the abnormal driving behavior so that the strategy is customized for the type. The set of pre-approved strategies is pre-approved by the driver of the vehicle. The pre-approval occurs while to the vehicle is not moving but the driver is operating the vehicle. Implementations of the described techniques may include hardware, a method or process, or computer software on a computer-accessible medium.

One general aspect includes a computer program product including computer code stored on a non-transitory memory that is operable, when executed by an onboard vehicle computer, to cause the onboard vehicle computer to execute processes including: identifying an abnormal driving behavior of a driver of a vehicle at a time T; identifying a set of events that occurred within a predetermined time Δt before time T; executing, by a processor, a cause-and-effect analysis on the set of events to determine one or more events from the set of events that caused the abnormal driving behavior; and executing a strategy to reduce the abnormal driving behavior so that vehicle operation is improved.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
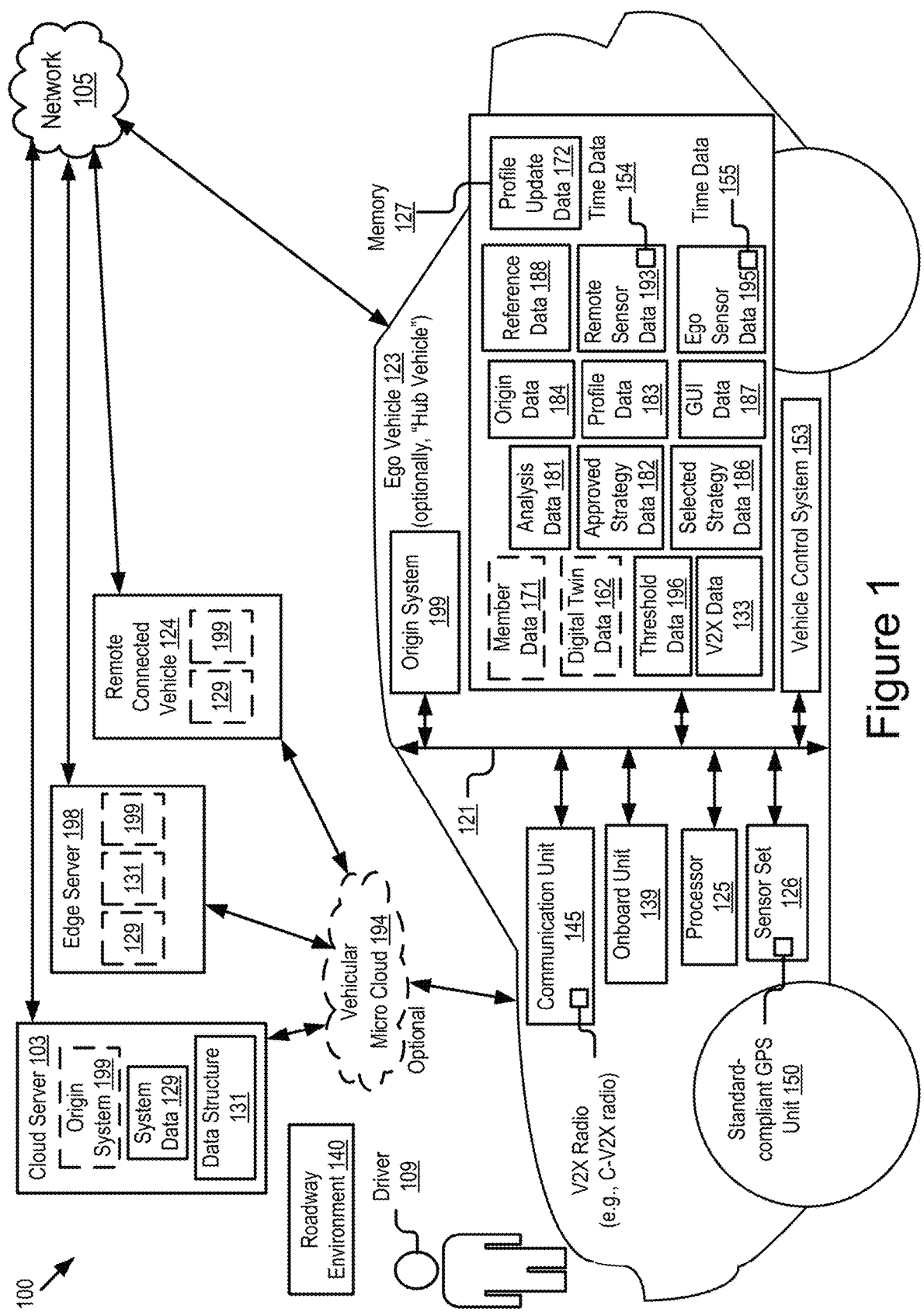
FIG. 1 is a block diagram illustrating an operating environment for an origin system according to some embodiments.

Described herein are embodiments of an origin system. The functionality of the origin system is now introduced according to some embodiments.

In some embodiments, the origin system includes code and routines that are operable, when executed by a processor, to cause the processor to execute one or more of the following steps: analyzing sensor data to determine that abnormal driving behavior of a vehicle operated by a driver is occurring; determining an origin of the abnormal driving behavior which is determined to be a root cause of the abnormal driving behavior; determining a strategy to implement to remove the origin of the abnormal driving behavior from future driving experiences of the driver (e.g., whether they are operating this vehicle or a different vehicle); implementing the strategy to the current and future driving experiences of the driver so that the origin of the abnormal driving behavior does not occur or is minimized sufficient so that the abnormal driving behavior does not reoccur responsive to this same origin; observing whether the strategy is implemented and satisfies a threshold for removing the abnormal driving behavior; and, responsive to determining that the threshold for removing the abnormal driving behavior is satisfied, updating a profile of the driver to include profile update data that describes one or more of (1) the origin of the abnormal driving behavior, (2) the abnormal driving behavior itself, and (3) the strategy which is implemented to remove the origin of the abnormal driving behavior.

Sensor Data

Vehicles include onboard sensors that constantly record sensor data describing their external environment. In some embodiments, the sensor data is time stamped so that individual sensor measurements recorded by the onboard sensors include a time stamp describing the time when the sensor measurement was recorded. Time data includes digital data that describes the time stamps for the sensor measurements that are described by the sensor data. Vehicles transmit V2X messages to one another. Examples of the time data according to some embodiments include the time data 154, 155 depicted in FIG. 1.

The sensor data includes digital data describing the sensor measurements recorded by the onboard sensors (e.g., the sensor set). These V2X messages include V2X data in their payload. The V2X data includes, among other things, the sensor data they record. Vehicles that receive these V2X messages use this V2X data to improve their awareness of their environment. For vehicles that include Advanced Driver Assistance Systems (ADAS systems) or autonomous driving systems, the V2X data is inputted to these systems so that they can better understand their driving environment when providing their functionality.

An example of one specific type of sensor data includes GPS data. "GPS" refers to "geographic positioning system." The GPS data includes digital data that describes the geographic location of an object such as a vehicle or a smartphone.

An example of the V2X data according to some embodiments includes the V2X data 133 depicted in FIG. 1. An example of the sensor data according to some embodiments includes the ego sensor data 195 and the remote sensor data 193 depicted in FIG. 1. The ego sensor data 195 includes sensor data recorded by the sensor set 126 of the ego vehicle 123. The remote sensor data 193 includes sensor data recorded by the sensor set 126 of the remote connected vehicle 124. For example, with reference to FIG. 1, the remote sensor data 193 is received by the communication unit 145 of the ego vehicle 123 via a V2X transmission that includes V2X data 133 including the remote sensor data 193 as its payload; the origin system 199 then parses the remote sensor data 193 from the V2X data 133 and stores the V2X data 133 and the remote sensor data 193 in the memory 127 of the ego vehicle 123. The remote sensor data 193 serves as a source of data, in addition to the ego sensor data 195 and the reference data 188, for identifying the occurrence of abnormal driving behavior by the driver 109 of the ego vehicle 123. In some embodiments, the V2X data 133 is received by the ego vehicle 123 because the ego vehicle 123 and the remote connected vehicle 124 are members of the same vehicular micro cloud 194. Vehicular micro clouds are described in more detail below according to some embodiments.

A vehicle control system is an onboard system of a vehicle that controls the operation of a functionality of the vehicle. ADAS systems and autonomous driving systems are examples of vehicle control systems. Examples of the vehicle control system according to some embodiments includes the vehicle control system 153 depicted in FIG. 1.

Example General Method

In some embodiments, the origin system includes code and routines that are operable, when executed by a processor, to cause the processor to execute one or more steps of an example general method described herein. The origin system may be an element of one or more of an ego vehicle, a remote connected vehicle, a cloud server, or an edge server installed in a roadway device such as a roadside unit (RSU). As described, the origin system is an element of the ego vehicle, but this description is not intended to be limiting.

In some embodiments, these steps are executed by a processor or onboard vehicle computer of an ego vehicle. The ego vehicle is a connected vehicle. A connected vehicle is a vehicle that includes a communication unit. An example of a communication unit includes the communication unit 145 depicted in FIG. 1. The remote connected vehicle is also a connected vehicle, and so, it includes a communication unit.

As used herein, the term "wireless message" refers to a V2X message transmitted by a communication unit of a connected vehicle such as a remote connected vehicle or the ego vehicle.

An example of the example general method is now described. In some embodiments, one or more steps of the example general method are skipped. The steps of the example general method may be executed in any order, and not necessarily the order presented. In some embodiments, a plurality of vehicles on a roadway include instances of the origin system and the origin systems of these vehicles also execute some or all of the steps described below. For example, one or more of these steps are executed by the members of a vehicular micro cloud in some embodiments. Vehicular micro clouds are not a requirement of the origin system.

The steps of the example general method are now described according to some embodiments.

Step 1: A driver creates a profile for themselves. The driver includes a human driver of the ego vehicle. An example of a driver according to some embodiments includes the driver 109 depicted in FIG. 1.

The profile data includes digital data that describes the profile for a driver. The profile describes, among other things, a set of strategies for correcting abnormal driving behavior which have been approved by the driver. For example, the origin system does not implement a strategy to correct the origin of abnormal driving behavior unless the strategy has been pre-approved by the driver, and the profile data includes digital data that describes the strategies which have been pre-approved by the driver. Note that the strategy is selected by the origin system to correct the origin of the abnormal driving behavior, and not the abnormal driving behavior itself.

In some embodiments, these pre-approvals are on a use-by-use or trip-by-trip basis so that they expire after each use of the ego vehicle by the driver or each trip by the driver, respectively.

In some embodiments, the pre-approvals do not expire. In some embodiments, the origin system is configured so that a driver's pre-approvals for strategies follow them from vehicle-to-vehicle. For example, if a driver is operating their personal ego vehicle in California, then the pre-approved strategies apply for each use of their personal ego vehicle. If this same driver travels to Germany and rents a remote connected vehicle which also has an instance of the origin system, the pre-approvals will be valid when the driver uses this rented remote connected vehicle so long as they log on to their account for the origin system via an interface of the rented remote connected vehicle (e.g., the touchscreen display of the infotainment system, a microphone, any other interface).

The profile data is stored in a non-transitory memory. In some embodiments, a vehicle (e.g., ego vehicle 123) which includes an instance of the origin system includes a non-transitory memory (e.g., memory 127) that stores profile data for one or more drivers that operate the vehicle.

In some embodiments, the profile data for a fleet of vehicles (e.g., the ego vehicle and one or more remote connected vehicles) is stored and/or backed up by a cloud server which manages the profile data for the fleet of vehicles. For example, the profile data is stored in a data structure of a cloud server (and/or the edge server) which is accessible by the fleet of vehicles having their own instances of the origin system.

A data structure includes a non-transitory memory that organizes a set of data such as the system data. An example of the data structure according to some embodiments includes the data structure 131 depicted in FIG. 1. The system data includes some or all of the digital data described herein. An example of the system data according to some embodiments includes the system data 129 depicted in FIG. 1.

The cloud server includes a hardware server. An example of the cloud server includes the cloud server 103 depicted in FIG. 1.

In some embodiments, the data structure is an element of an edge server. An example of the edge server according to some embodiments includes the edge server 198 depicted in FIG. 1. An edge server includes a hardware server. In some embodiments, the edge server is an element of a roadside device such as a roadside unit.

An example of the profile data according to some embodiments includes the profile data 183 depicted in FIG. 1.

In some embodiments, the profile data describes a set of strategies that are pre-approved by an engineer of the ego vehicle itself as effective at correcting particular abnormal driving behaviors in particular contexts. In some embodiments, the origin system does not implement a strategy unless it is approved by the both the engineer and the driver that is operating the ego vehicle at the time when the strategy would be implemented. In this way, the origin system ensures that only effective strategies are implemented and that their implementation does not surprise or anger the driver of the ego vehicle.

In some embodiments, approved strategy data includes digital data that describes the pre-approved strategies. An example of the approved strategy data according to some embodiments includes the approved strategy data 182 depicted in FIG. 1.

The following steps assume that the driver of the ego vehicle has inputted their profile data so that the origin system considers the profile data when implementing strategies to correct the origin of abnormal driving behavior.

Step 2: The origin system causes the sensor set of the ego vehicle to record ego sensor data. The ego sensor data includes digital data that describes the sensor measurements of the sensors that are included in the sensor set of the ego vehicle. In some embodiments, the individual sensor measurements are time stamped so an instance of ego sensor data describes both a sensor measurement and when this measurement was recorded. In some embodiments, the ego sensor data includes time data that describes the timestamps for the sensor measurements.

In some embodiments, the sensor measurements described by the ego sensor data describe one or more of the following: the ego vehicle over time including its location in a roadway environment over time; the location of the ego vehicle relative to other objects within the roadway environment over time; the driver's operation of the ego vehicle over time, the presence of other objects over time within the roadway environment that includes the ego vehicle; the location of these objects in the roadway over time relative to other objects (e.g., the location of these other objects relative to one another and relative to the ego vehicle); and the behavior of these other objects over time (e.g., a remote connected vehicle driving abnormally).

An example of the ego sensor data according to some embodiments includes the ego sensor data 195 depicted in FIG. 1. An example of the time data associated with the ego sensor data 195 according to some embodiments includes the time data 155 depicted in FIG. 1.

The sensors included in the sensor set, and the type of measurements they can record, are described in more detail below.

Step 3: (Optional) A set of one or more remote connected vehicles in sensor range of the ego vehicle include their own instance of the origin system. The origin system of these remote connected vehicles causes the sensor sets of these remote connected vehicles to record sensor measurements of their roadway environment. These sensor measurements include sensor measurements of the ego vehicle and the behavior of the ego vehicle over time.

The sensor measurements recorded by an individual remote connected vehicle from the set of remote connected vehicles is described by remote sensor data. The remote sensor data includes digital data that describes the sensor measurements of the sensors that are included in the sensor set of the remote connected vehicle. In some embodiments, the individual sensor measurements are time stamped so an instance of remote sensor data describes both a sensor measurement and when this measurement was recorded. In some embodiments, the remote sensor data includes time data that describes the timestamps for the sensor measurements.

In some embodiments, the sensor measurements described by the remote sensor data describe one or more of the following: the remote connected vehicle over time including its location in a roadway environment over time; the location of the remote connected vehicle relative to other objects within the roadway environment over time; a driver's operation of the remote connected vehicle over time, the presence of other objects (including the presence of the ego vehicle) over time within the roadway environment that includes the remote connected vehicle; the location of these objects (including the location of the ego vehicle) in the roadway over time relative to other objects (e.g., the location of the ego vehicle relative to the remote connected vehicle as measured from the perspective of the remote connected vehicle); and the behavior of these other objects (including the behavior of the ego vehicle) over time (e.g., abnormal driving behavior of the ego vehicle as recorded by the sensors of the remote connected vehicle as well as an event which preceded the abnormal driving behavior).

An example of the remote sensor data according to some embodiments includes the ego sensor data 195 depicted in FIG. 1. An example of the time data associated with the remote sensor data 193 according to some embodiments includes the time data 154 depicted in FIG. 1.

The sensors included in the sensor sets of the remote connected vehicles are similar to those included in the ego vehicle.

In some embodiments, the ego vehicle and the set of remote connected vehicles described in step 3 are all members of a vehicular micro cloud. In some embodiments, an origin system of a vehicle that includes an origin system (e.g., the ego vehicle) initiates the creation of the vehicular micro cloud responsive to observing one of the vehicles in the roadway environment (e.g., the ego vehicle itself) being driven abnormally based on analysis of its own sensor data (e.g., the ego sensor data). Vehicular micro clouds are described in more detail herein. For example, a description of vehicular micro clouds is provided following the description of the example general method.

Step 4: (Optional) The origin systems of the set of remote connected vehicles described in step 3 build V2X messages including V2X data. V2X data includes digital data that is the payload for a V2X message. An example of the V2X data according to some embodiments includes the V2X data 133 depicted in FIG. 1. In some embodiments, the origin systems of the set of remote connected vehicles described in step 3 build V2X data 133 including their remote sensor data 193 and time data 154; these origin systems build V2X messages including the V2X data 133 as their payloads and cause the communication units of these remote connected vehicles to transmit V2X messages including the V2X messages. Each instance of V2X data 133 for each remote connected vehicle includes a plurality of instances of remote sensor data 193 and corresponding time data 154 for the sensor measurements described by this remote sensor data 193. Each of the remote connected vehicles builds its own V2X message including its own V2X data. Each origin system of each remote connected vehicle causes the communication unit of each of the remote connected vehicles to broadcast its own V2X message.

Step 5: (Optional) The V2X messages broadcast at step 4 are received by the communication unit of the ego vehicle. The origin system of the ego vehicle parses the V2X data 133 from the V2X messages received by the communication unit of the ego vehicle and stores the V2X data 133 in the memory of the ego vehicle. The origin system of the ego vehicle parses the remote sensor data 193 and the time data 154 from these instances of V2X data 133 and stores the remote sensor data 193 and the time data 154 in the memory. In this way the origin system of the ego vehicle receives the remote sensor data 193 and the time data 154 from a set of remote connected vehicles. The origin system of the ego vehicle therefore has access to a rich data set including its own ego sensor data 195 and the remote sensor data 193 of a set of remote connected vehicles 124 to consider in the subsequent steps of this example general method.

Step 6: The origin system of the ego vehicle analyzes the available sensor data. This sensor data includes the ego sensor data and, optionally, one or more sets of remote sensor data received at step 5. The ego sensor data and the remote sensor data are referred to separately or collectively as the "sensor data." The origin system of the ego vehicle analyzes the sensor data relative to the reference data to identify if the ego vehicle is behaving abnormally. Reference data includes digital data that describes one or more of the known abnormal driving behaviors and the object priors described herein. An example of the reference data according to some embodiments includes the reference data 188 depicted in FIG. 1.

If abnormal behavior is identified by the origin system at step 6, then the example general method proceeds to step 7. If abnormal behavior is not identified by the origin system at step 6, then the example general method restarts at step 1 and proceeds from there until abnormal behavior is identified at step 6. The steps of this example general method subsequent to step 6 assume that the origin system identifies abnormal behavior at step 6.

Figure 3:
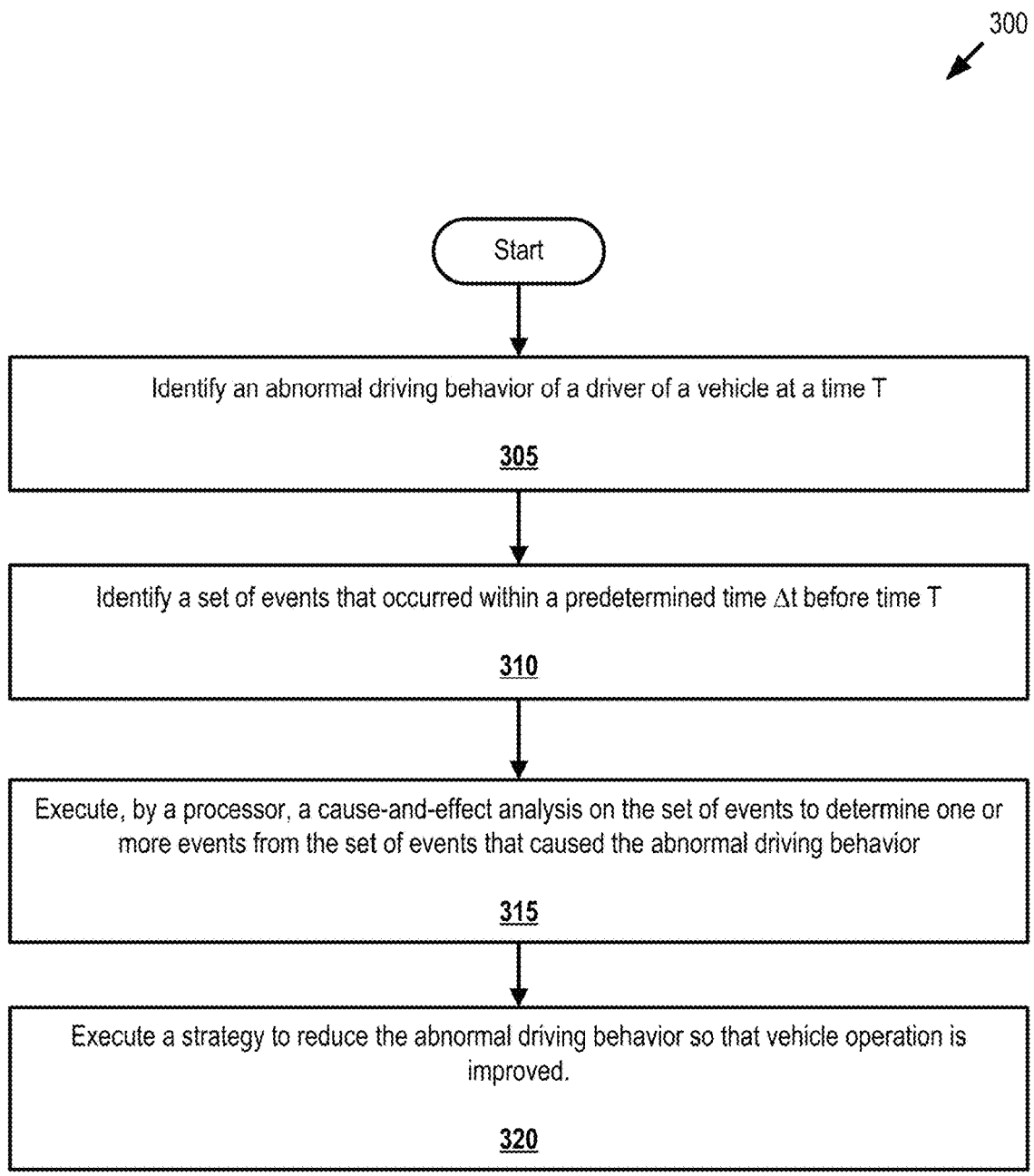
FIG. 3 is a flowchart of an example method for determining an origin of abnormal driving behavior and implementing a strategy to reduce the abnormal driving behavior based on the origin according to some embodiments.

In some embodiments, this step 6 corresponds to step 305 in the method 300 depicted in FIG. 3 according to some embodiments.

Step 7: (Optional) In some embodiments, the origin system of the ego vehicle takes step to form a vehicular micro cloud responsive to identifying the abnormal driving behavior at step 6. The ability of the origin system to form a vehicular micro cloud is beneficial, for example, since it provides the origin system of the ego vehicle with access to greater computational resources of a plurality of connected vehicles in order to provide services such as one or more of the following: identifying the origin of the abnormal behavior; selecting a strategy to reduce, minimize, or remove the origin of the abnormal behavior; and implementing the strategy to reduce, minimize, or remove the origin of the abnormal behavior. There are numerous other ways that the formation of a vehicular micro cloud benefits the functionality of the origin system to identify the origin of a driver's abnormal driving behavior and the implementation of a strategy to address the origin of the driver's abnormal driving behavior. Vehicular micro clouds are described in more detail herein. For example, a description of vehicular micro clouds follows the description of this example general method.

Step 8: The origin system analyzes the sensor data and the reference data to determine the time "T" when the ego vehicle began to behave abnormally. For example, the origin system analyzes the sensor data and determines that: (1) a particular instance of sensor data (e.g., sensor data 195 or remote sensor data 193) describes a measurement that, when compared to the reference data 188 by the origin system, indicates that the ego vehicle is acting abnormally; (2) the particular instance of sensor data is associated with, or includes within in it, time data describing the time "T" when the ego sensor data was recorded; (3) at a set of time prior to "T" the sensor data, when compared to the reference data 188 by the origin system, indicates that the ego vehicle is not behaving abnormally; and (4) that the ego vehicle began to behave abnormally at time "T" since it is not behaving abnormally based on the sensor data associated with the time data describing the set of time prior to "T." In this way the origin system is able to analyze the sensor data in view of the reference data to identify the time "T" when the ego vehicle began to behave abnormally. In some embodiments, this time "T" is the same time referred to below in the description of the happens-before relationship analysis. In some embodiments, the set of time prior to "T" is referred to in the description of the happens-before relationship analysis as "$\Delta t$."

In some embodiments, the sensor data associated with time "T" describes a measurement that, when compared to the reference data by the origin system, indicates one or more of driving events, driving actions, and a particular driving behavior which is abnormal. The driving events, driving actions, and particular driving behavior for time "T" are referred to again below with the description of the happens-before relationship analysis.

Similarly, the set of time "$\Delta t$" is associated with a set of sensor measurements that, when compared to the reference data by the origin system, indicates one or more of driving events, driving actions, and a particular driving behaviors as indicated by the reference data (e.g., object priors which indicate different events, actions, or patterns of actions, i.e., behaviors). These driving events, driving actions, and particular driving behavior for the set of time "$\Delta t$" are referred to again below with the description of the happens-before relationship analysis.

Step 9: The origin system initiates an analysis of the sensor data to determine the origin of the abnormal driving behavior. The analysis data includes digital data that describes this analysis. An example of the analysis data according to some embodiments includes the analysis data 181 depicted in FIG. 1. The origin data includes digital data that describes the origin identified by this analysis. An example of the origin data according to some embodiments includes the origin data 184 depicted in FIG. 1.

In some embodiments, the analysis executed by the origin system at step 9 includes one or more of the following: (1) a happens-before relationship analysis; and (2) a cause-and-effect analysis. Each of these individual processes for analysis are described in more detail below under appropriate headers. These descriptions of these processes for analysis are part of the description of the example general method and also applicable in general for other methods executed by the origin system in some embodiments.

Happens-Before Relationship Analysis

Figure 4:
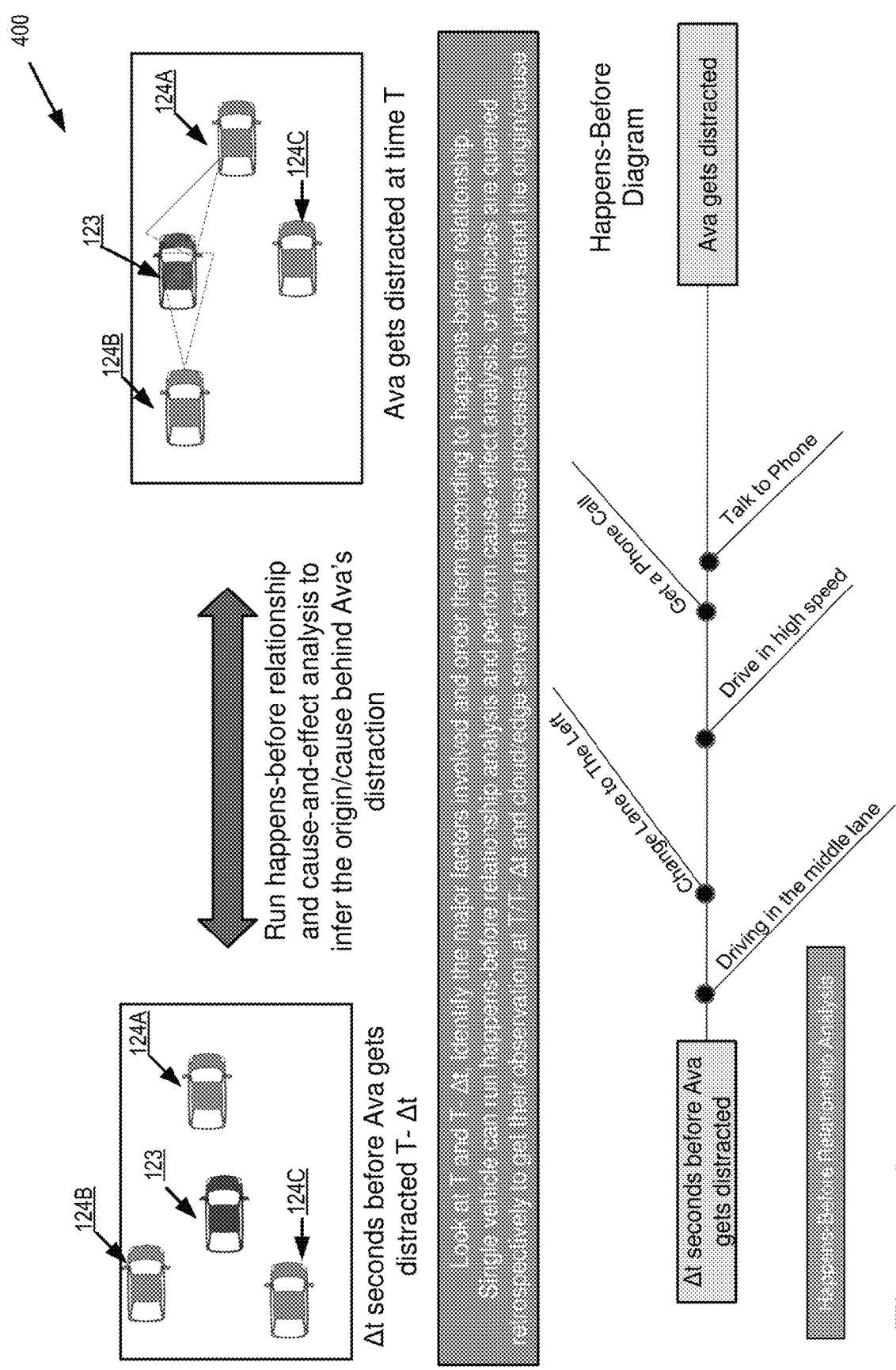
FIG. 4 is a block diagram of a happens-before analysis for a first use case according to some embodiments.

In some embodiments, a happens-before relationship analysis includes one or more of the following steps: (1) retrieving the sensor data describing the sensor measurements for time "T"; (2) determining one or more of the driving events, driving actions, and particular driving behaviors [including the abnormal driving behavior] that occurred at time "T" by comparing the sensor data for time "T" to the reference data; (3) retrieving the sensor data describing the sensor measurements for the set of time set of time "$\Delta t$"; (4) determining one or more of the driving events, driving actions, and particular driving behaviors that occurred at the set of time "$\Delta t$" by comparing the sensor data for the set of time "$\Delta t$" to the reference data; (5) chronologically ordering the driving events, driving actions, and a particular driving behaviors for time "T" and the set of time "$\Delta t$"; and (6) constructing a happens-before diagram that describes the chronological order of the driving events, driving actions, and particular driving behaviors for time "T" and the set of time "$\Delta t$". Examples of happens-before diagrams according to some embodiments are depicted at the bottom of FIG. 4 and the bottom of FIG. 6.

In some embodiments, the set of time "$\Delta t$" used in the happens-before relationship analysis is not the same set of time "$\Delta t$" used to identify the time "T." Instead, in some embodiments the set of time "$\Delta t$" is a predetermined time interval before time "T" that corresponds to the time when the abnormal driving behavior began. In some embodiments, this predetermined time interval is a first set of time programmed into the origin system by an engineer of the origin system. For example, the first set of time "$\Delta t$" is 0.1 seconds before T. The origin system analyzes the events that occurred during this first set of time "Δt" to determine the events that occurred during the first set of time "Δt." These events are described by factor data within the analysis data 181. The origin system optionally forms a second set of time "Δt" by increasing the first set of time "Δt" by some interval such as 0.1 seconds so that the second set of time "Δt" is 0.2 seconds before time "T." The time intervals described here are non-limiting examples; other time intervals are possible. The origin system analyzes the events that occurred during this second set of time "Δt" to determine the events that occurred during the second set of time "Δt." These events are described by factor data within the analysis data 181. This process of increasing the time interval (i.e., the set of time "Δt") is repeated until a threshold is satisfied.

In some embodiments, the threshold is one which is configured to ensure that the time interval is large enough to include the event or set of events that caused the abnormal driving behavior, i.e., the origin of the abnormal driving behavior.

In some embodiments, the threshold includes one or more of the following: an amount of time that must be covered by the set of time "Δt"; an amount of time that must be covered by the set of time "Δt" where the amount of time is variable based on the type of abnormal driving behavior that occurred at time "T"; a number of events that are described by the factor data included in the analysis data 181; an amount of time that must be covered by the set of time "Δt" where the amount of time is determined based on analysis of historical data that describes the amount of time that is appropriate for the type of abnormal driving behavior that occurred at time "T"; a number of events described by the factor data included in the analysis data where the number of events is determined based on analysis historical data that describes the amount of time that is appropriate for the type of abnormal driving behavior that occurred at time "T"; an amount of time that must be covered by the set of time "Δt" where the amount of time is determined based on digital twin simulations of events that simulated the type of abnormal driving behavior that occurred at time "T"; a number of events described by the factor data included in the analysis data where the number of events is determined based on digital twin simulations of events that simulated the type of abnormal driving behavior that occurred at time "T"; an amount of time that must be covered by the set of time "Δt" where the amount of time is determined based on deep learning algorithm analysis of historical data that describes the amount of time that is appropriate for the type of abnormal driving behavior that occurred at time "T"; and a number of events described by the factor data included in the analysis data where the number of events is determined based on deep learning algorithm analysis of historical data that describes the amount of time that is appropriate for the type of abnormal driving behavior that occurred at time "T."

In some embodiments, the factor data includes digital data that describes one or more driving events, driving actions, and particular driving behaviors [including the abnormal driving behavior] that occurred at particular timestamps described by the time data.

In some embodiments, the historical data includes digital data stored on the memory of the ego vehicle and describing past abnormal driving behaviors by type and the intervals of time prior to time "T" for these abnormal driving behaviors when the event that was the origin of the abnormal driving behavior was found by the origin system. In other words, the historical data describes the lessons learned by the origin system based on its past operation such that the historical data beneficially enables the origin system to improve its accuracy and speed of analysis over time.

The origin system includes code and routines that are operable, when executed by a processor of the ego vehicle, to cause the processor to execute the happens-before relationship analysis.

The happens-before diagram and the happens-before relationship analysis are described by the analysis data.

Cause-and-Effect Analysis

Figure 5:
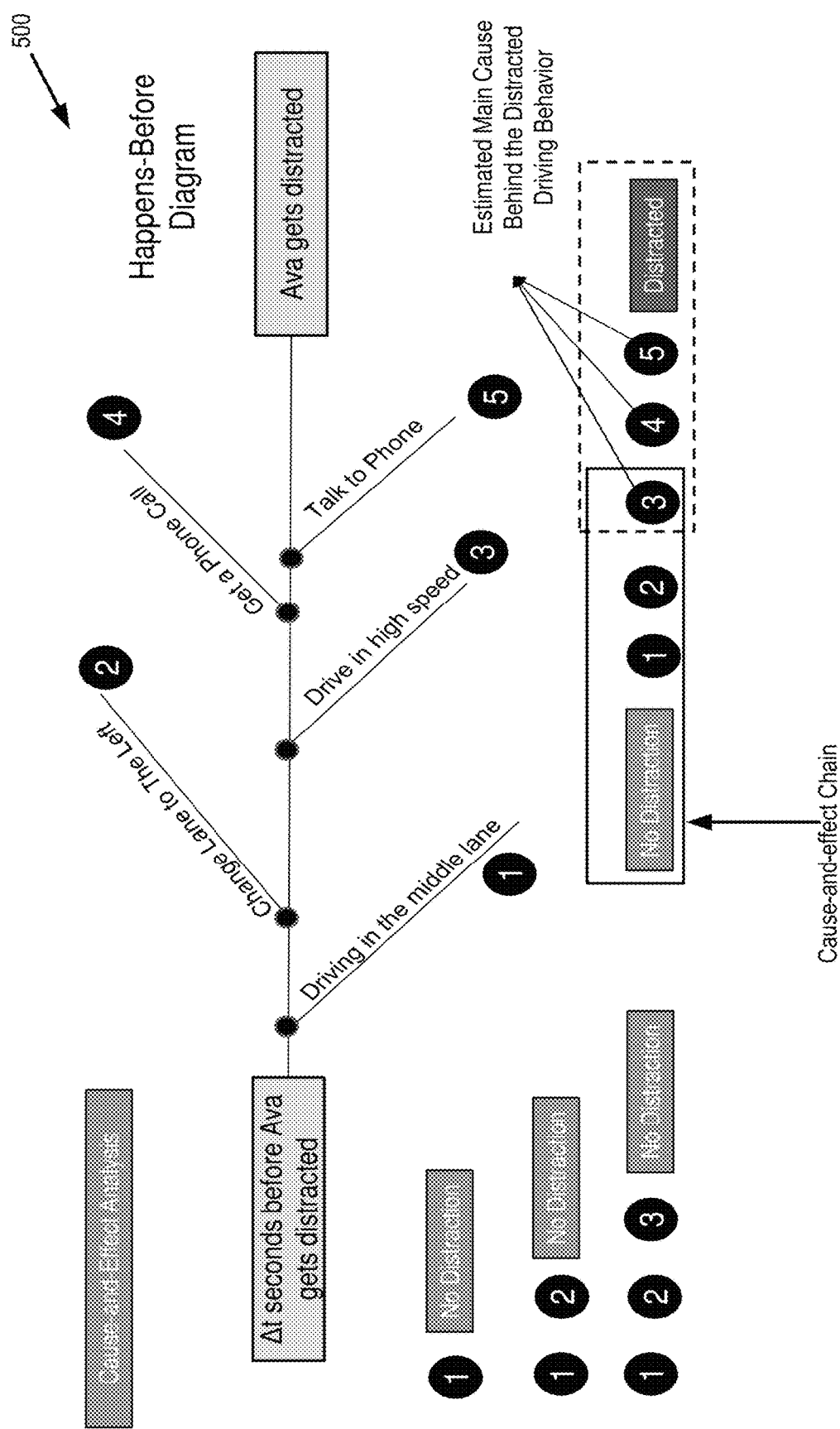
FIG. 5 is a block diagram of a cause-and-effect analysis for the first use case according to some embodiments.
Figure 7:
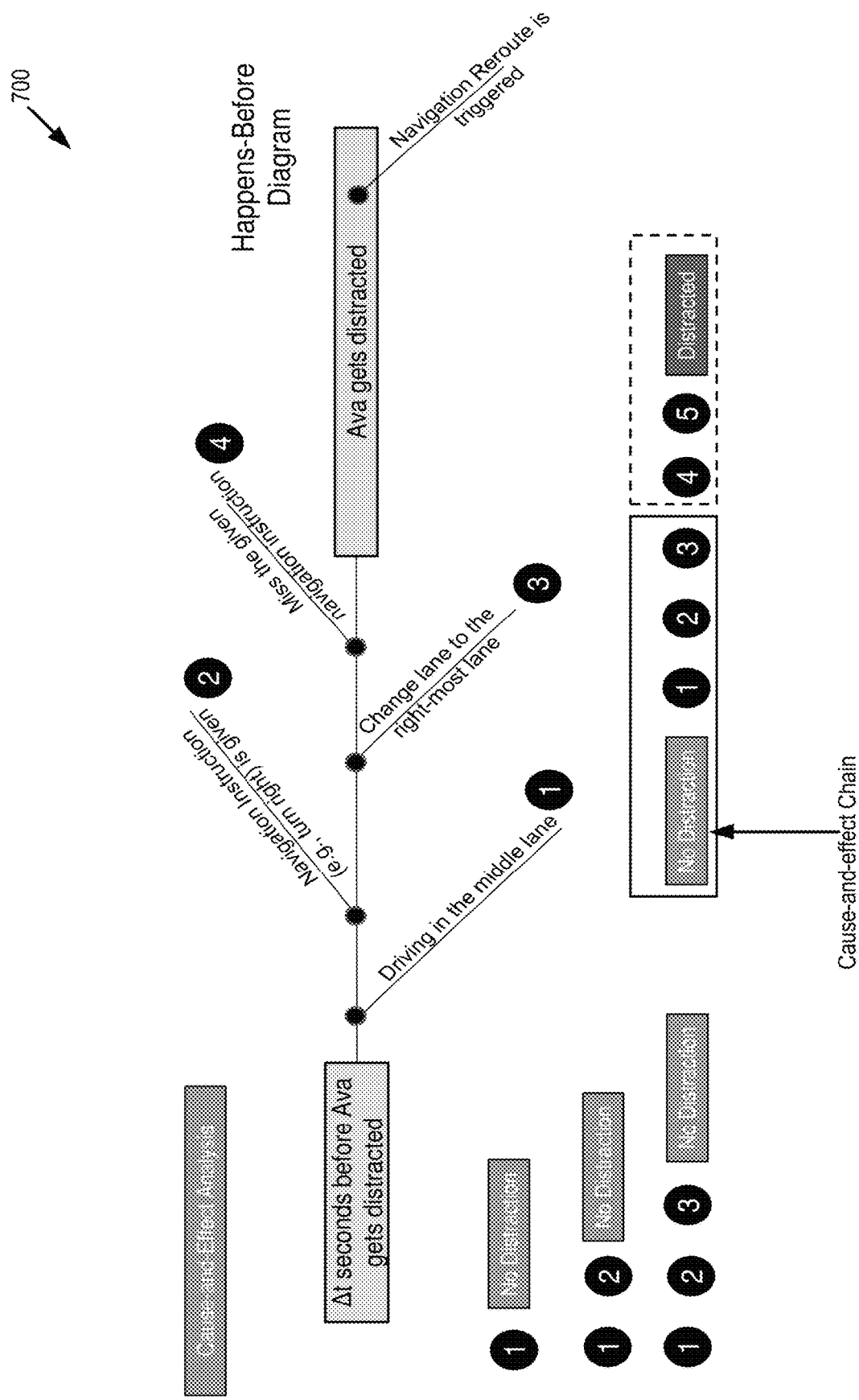
FIG. 7 is a block diagram of a cause-and-effect analysis for the second use case according to some embodiments.

In some embodiments, a cause-effect analysis includes one or more of the following steps: (1) analyzing the happens-before relationship diagram described by the analysis data by grouping the factor data chronologically in groups of one-by-one (e.g., one factor by one factor), two-by-two (e.g., two factors by two factors), and N-by-N (e.g., N factors by N factors, where "N" is any positive whole number); (2) analyzing the groups of factors in chronological order relative to one another to determine which factors precipitated one another (e.g., determining the cause-and-effect relationships among the factors relative to one another chronologically), including, or in some embodiments with exclusive emphasis on, the factors that precipitated the abnormal driving behavior at time "T"; (3) constructing one or more cause-and-effect diagrams based at least in part on the on the analysis of step 2; (4) analyzing the cause-and-effect diagrams to determine the origin of the abnormal driving behavior diagram; and (5) outputting origin data describing the origin of the abnormal driving behavior. Examples of cause-and-effect diagrams according to some embodiments are depicted in FIGS. 5 and 7.

The origin data includes digital data describing the origin of the abnormal driving behavior. An example of the origin data according to some embodiments includes the origin data 184 depicted in FIG. 1.

Step 10: Selecting, form the set of pre-approved strategies described by the approved strategy data, a selected strategy to implement by either the ego vehicle or the vehicular micro cloud. The output of this step is the selected strategy data. The selected strategy data includes digital data that describes the strategy selected from the set of pre-approved strategies to minimize, reduce, or eliminate the origin of an abnormal driving behavior identified by the origin system. An example of the selected strategy data according to some embodiments includes the selected strategy data 186 depicted in FIG. 1.

Step 11: The origin system takes steps to implement the selected strategy for one or more of the current and future driving experiences so that the abnormal driving behavior does not occur for the same reason in the future. In some embodiments, implementing the selected strategy includes causing an electronic display of the ego vehicle to display a graphical user interface (GUI) or some other data that informs the driver that the selected strategy will be implemented. GUI data includes digital data that is outputted by the origin system and causes the electronic display to display the GUI informing the driver about the selected strategy and its implementation. An example of the GUI data according to some embodiments includes the GUI data 187 depicted in FIG. 1.

Step 12: The origin system updates the profile for the driver to include the profile update data 172 which is outputted from the above steps. In this way the selected strategy is implemented by the origin system of this ego vehicle and any other vehicle that the driver operates that includes an instance of the origin system therein.

In some embodiments, the origin system of the ego vehicle uses digital twin simulations to provide its functionality. For example, the origin system uses digital twin simulations to identify which strategies will correct which abnormal driving behaviors or which factors are likely to precipitate which types of abnormal driving behavior. In this way the digital twin simulations execute various simulations which attempt to help the origin system to provide its functionality. Digital twin data includes any digital data that is necessary to execute the digital twin simulations and output the origin data. The digital twin data also describes the output of these digital twin simulations (e.g., the digital twin data includes a recommendation for which pre-approved strategy to select to address the origin of the abnormal driving behavior identified by the origin system). An example of the digital twin data according to some embodiments includes the digital twin data 162 depicted in FIG. 1. Digital twin simulations are described in more detail below.

In some embodiments, the origin system makes similar determinations based on one or more of pattern recognition, time series analysis, and deep learning analysis. The origin system includes code and routines and any digital data necessary to execute the pattern recognition analysis, time series analysis, and/or deep learning analysis.

The pattern recognition data includes any digital data that is necessary for the origin system to perform the pattern recognition analysis using one or more of the following as inputs to a pattern recognition algorithm included in the origin system: the reference data; the sensor data; the profile data; the factors data; the historical data; and the approved strategies data. The pattern recognition data may include object priors or any other digital data that is necessary for this analysis. In some embodiments, the pattern recognition data is an element of the system data 129 and stored in the data structure 131.

The time series analysis data includes any digital data that is necessary for the origin system to perform the time series analysis using one or more of the following as inputs to a time series analysis algorithm included in the origin system: the reference data; the sensor data; the profile data; the factors data; the historical data; and the approved strategies data. In some embodiments, the time series analysis data is an element of the system data 129 and stored in the data structure 131.

The deep learning analysis data includes any digital data that is necessary for the origin system to perform the deep learning analysis using one or more of the following as inputs to a deep learning algorithm included in the origin system: the reference data; the sensor data; the profile data; the factors data; the historical data; and the approved strategies data. In some embodiments, the deep learning analysis data is an element of the system data 129 and stored in the data structure 131.

Vehicular Micro Clouds

Vehicular micro clouds are an optional feature of some of the embodiments described herein. Some of the embodiments described herein include vehicular micro clouds. For example, some or all of the vehicles which are registered with the origin system are connected vehicles (e.g., vehicles that include a processor, a communication unit, and an instance of the origin system) and members of a vehicular micro cloud. In some embodiments, the vehicular micro cloud hosts the origin system in a distributed fashion using the computing resources of the vehicles that are members of the vehicular micro cloud so that a cloud server and/or an edge server is not strictly necessary to provide the service of the origin system to the users of the origin system. Some of the embodiments described herein do not include vehicular micro cloud.

In some embodiments, a server such as a cloud server and/or an edge server is also an element of the vehicle micro cloud.

In some embodiments, a vehicular micro cloud includes as a group of connected vehicles where vehicles perform task(s) cooperatively/collaboratively. Vehicular micro clouds can be divided into two categories based on their mobility: (1) stationary; and (2) mobile.

In the stationary cloud, a certain geographical region is designated as the vehicular micro cloud region, and vehicles entering that region contribute their resources for vehicular cloud services. A stationary vehicular micro cloud is sometimes referred to as a "static" vehicular micro cloud.

In the mobile vehicular cloud, on the other hand, the vehicular micro cloud moves as the micro cloud members move. A mobile vehicular micro cloud is sometimes referred to as a "dynamic" vehicular micro cloud.

In some embodiments, as an optional operating environment, the origin system is hosted by a plurality of members of a vehicular micro cloud. These members are also registered with the origin system. The origin system causes the vehicles, which each include an instance of the origin system or at least a subset of the code and routines of the origin system, to execute steps to form the vehicular micro cloud.

Member data includes digital data that describes information about a vehicular micro cloud and its members. For example, the member data is digital data that describes the identity of the members of the vehicular micro cloud and their specific computing resources; all members of the vehicular micro cloud make their computing resources available to one another for their collective benefit. An example of the member data according to some embodiments includes the member data 171 depicted in FIG. 1. In some embodiments, the origin system 199 cause the communication unit to transmit a wireless message to candidates for membership in the vehicular micro cloud that causes these candidates to join the vehicular micro cloud. The list of candidates is determined by the origin system based on the technical data which is transmitted by the candidates to one another via BSMs; in some embodiments, these BSMs also include sensor data recorded by the vehicles that transmit the BSMs. Vehicular micro clouds are described in more detail below according to some embodiments.

Vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task. An example of a task includes, for example, determining and executing vehicle driving maneuvers that eliminates an origin of an abnormal driving behavior identified by the origin system.

In some embodiments, the vehicular micro cloud tasks provided by the vehicular micro cloud includes some or all of the tasks which are necessary to provide the functionality of the origin system described herein. In some embodiments, a vehicular micro cloud includes a group of connected vehicles that communicate with one another via V2X messages to provide the service of the origin system to the ego vehicle and/or the members of the vehicular micro cloud.

The vehicular micro cloud includes multiple members. A member of the vehicular micro cloud includes a connected vehicle that sends and receives V2X messages via the network (e.g., the network 105 depicted in FIG. 1). In some embodiments, the network is a serverless ad-hock vehicular network. In some embodiments, the members of the network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set.

In some embodiments, an operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but is able to provide shared rides to users because the driver of the legacy vehicle has a smart device (e.g., an electronic processor-based computing device such as a smartphone, smartwatch, tablet computer, laptop, smart glasses, etc.) which they use to receive information that enables them to participate as registered vehicles that provide shared rides to the users of the Service provided by the origin system.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure that is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "vehicular micro cloud" since a vehicular micro cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., some or all of the system data 129 described herein), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "vehicular micro cloud tasks" if plural, or a "vehicular micro cloud task" if singular.

In some embodiments, a vehicular micro cloud task includes any computational, data storage, or data communication task collaboratively performed by a plurality of the members of a vehicular micro cloud. In some embodiments, the set of tasks described above with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to solve a problem (e.g., identifying the origin of an abnormal driving behavior exhibited by the ego vehicle), and the result includes digital data that describes the solution to the problem (e.g., selecting and/or implementing the selected strategy described by the selected strategy data). In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks (e.g., determining the analysis data, executing the digital twin simulations, etc.) that they could not perform alone or store large data sets that they could not store alone. In some embodiments, the computational power of a solitary ego vehicle is sufficient to execute these tasks.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

In some embodiments, the functionality provided by the origin system is a task provided by the vehicular micro cloud. For example, the origin system is an element of a hub of a vehicular micro cloud. The origin system receives a set of wireless messages and this triggers the origin system to form a vehicular micro cloud. The origin system processes V2X data for the benefit of one or more members of the vehicular micro cloud. For example, the ego vehicle includes computational power that exceeds that of another member, and the ego vehicle processes wireless messages for this member which would otherwise be unable to do so, or unable to do so in a timeframe that satisfies a threshold for latency. Hub vehicles are described in more detail below.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote connected vehicle depicted in FIG. 1 are connected vehicles.

A connected vehicle is a conveyance, such as an automobile, that includes a communication unit that enables the conveyance to send and receive wireless messages via one or more vehicular networks. The embodiments described herein are beneficial for both drivers of human-driven vehicles as well as the autonomous driving systems of autonomous vehicles. For example, the origin system improves the performance of a vehicle control system, which benefits the performance of the vehicle itself by enabling it to operate more safety or in a manner that is more satisfactory to a human driver of the ego vehicle.

In some embodiments, the origin system improves the performance of a network because it beneficially takes steps to enable the completion of vehicular micro cloud tasks.

In some embodiments, the origin system improves the performance of a connected vehicle because it beneficially enables the onboard vehicle computer of a vehicle to identify an origin of its abnormal driving behavior and implement a strategy so that the events which originated the abnormal driving behavior do not occur in the future or do not occur sufficient to precipitate the abnormal driving behavior.

In some embodiments, the origin system is software installed in an onboard unit (e.g., an electronic control unit (ECU)) of a vehicle having V2X communication capability. The vehicle is a connected vehicle and operates in a roadway environment with N number of remote connected vehicles that are also connected vehicles, where N is any positive whole number that is sufficient to satisfy a threshold for forming a vehicular micro cloud. The roadway environment may include one or more of the following example elements: an ego vehicle; N remote connected vehicles; an edge server; and a roadside unit. For the purpose of clarity, the N remote connected vehicles may be referred to herein as the "remote connected vehicle" or the "remote connected vehicles" and this will be understood to describe N remote connected vehicles.

In some embodiments, the origin system includes code and routines stored on and executed by a cloud server or an edge server.

An example of a roadway environment according to some embodiments includes the roadway environment 140 depicted in FIG. 1. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote connected vehicles may be human-driven vehicles, autonomous vehicles, or a combination of human-driven vehicles and autonomous vehicles. In some embodiments, the ego vehicle and the remote connected vehicles may be equipped with DSRC equipment such as a GPS unit that has lane-level accuracy and a DSRC radio that is capable of transmitting DSRC messages.

In some embodiments, the ego vehicle and some or all of the remote connected vehicles include their own instance of an origin system. For example, in addition to the ego vehicle, some or all of the remote connected vehicles include an onboard unit having an instance of the origin system installed therein.

In some embodiments, the ego vehicle and one or more of the remote connected vehicles are members of a vehicular micro cloud. In some embodiments, the remote connected vehicles are members of a vehicular micro cloud, but the ego vehicle is not a member of the vehicular micro cloud. In some embodiments, the ego vehicle and some, but not all, of the remote connected vehicles are members of the vehicular micro cloud. In some embodiments, the ego vehicle and some or all of the remote connected vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1. The vehicular micro cloud 194 is depicted in FIG. 1 using a dashed line to indicate that it is an optional feature of the operating environment 100.

Accordingly, in some embodiments multiple instances of the origin system are installed in a group of connected vehicles. The group of connected vehicles are arranged as a vehicular micro cloud. As described in more detail below, the origin system further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

Hub or Hub Vehicle

Hub vehicles are an optional feature of the embodiments described herein. Some of the embodiments described herein include a hub vehicle. Some of the embodiments described herein do not include a hub vehicle.

In some embodiments, the origin system that executes a method as described herein (e.g., the method 300 depicted in FIG. 3 or the example general method described herein, etc.) is an element of a hub or a hub vehicle. For example, the vehicular micro cloud formed by the origin system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the operating environment 100 includes a roadside unit or some other roadway device, and this roadway device is the hub of the vehicular micro cloud.

In some embodiments, the origin system determines which member vehicle from a group of vehicles (e.g., the ego vehicle and one or more remote connected vehicles) will serve as the hub vehicle based on a set of factors that indicate which vehicle (e.g., the ego vehicle or one of the remote connected vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the origin system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include Basic Safety Messages (BSMs) which include such sensor data in part 2 of their payload. In some embodiments, the technical data is included in the member data (and/or sensor data) depicted in FIG. 1 which vehicles such as the ego vehicle 123 and the remote connected vehicle 124 broadcast to one another via BSMs. In some embodiments, the member data also includes the sensor data of the vehicle that transmits the BSM as well as some or all of the other digital data described herein as being an element of the member data.

In some embodiments, the technical data is an element of the sensor data (e.g., ego sensor data or remote sensor data provided by the remote connected data) which is included in the V2X data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the origin system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the origin system. For example, the origin system is an element of a roadside unit that includes a communication unit 145 but not a server. In another example, the origin system is an element of another vehicle such as one of the remote connected vehicles 124.

In some embodiments, the operating environment of the origin system includes servers. Optionally, in these embodiments the origin system includes code and routines that predict the expected latency of V2X communications involving serves and then time the transmission of these V2X communications so that the latency is minimized or reduced.

In some embodiments, the origin system is operable to provide its functionality even though the vehicle which includes the origin system does not have a Wi-Fi antenna as part of its communication unit. By comparison, some of the existing solutions require the use of a Wi-Fi antenna in order to provide their functionality. Because the origin system does not require a Wi-Fi antenna, it is able to provide its functionality to more vehicles, including older vehicles without Wi-Fi antennas.

In some embodiments, the origin system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the origin system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud. In some embodiments, vehicles which the origin system determines are ineligible to participate as members of the vehicular micro cloud are also excluded from providing rides to users as part of the Service.

In some embodiments, the origin system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the origin system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, in some but not all embodiments, any group of vehicles that includes a server or whose functionality incorporates a server is not a vehicular micro cloud as this term is used herein.

In some embodiments, a vehicular micro cloud formed by an origin system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the origin system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 300 depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the origin system, the server is an optional feature of the operating environment. An example of a preferred embodiment of the origin system does not include the server in the operating environment which includes the origin system.

In some embodiments, the origin system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the origin system requires vehicular micro cloud; this distinction alone differentiates the origin system from the existing solutions. The origin system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which sub-task they are performing among themselves while the sub-tasks are still being performed by the platoons in parallel. The existing solution also does not include functionality whereby platoons are re-organized based on monitored task executions results/performance and/or available vehicles and resources. As described herein, the origin system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 1 and 2.

A particular vehicle that includes these vehicle control systems is referred to herein as an "ego vehicle" and other vehicles in the vicinity of the ego vehicle as "remote connected vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the origin system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the origin system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the origin system includes software installed in an onboard unit of a connected vehicle. This software is the "origin system" described herein.

An example operating environment for the embodiments described herein includes an ego vehicle, one or more remote connected vehicles, and a recipient vehicle. The ego vehicle the remote connected vehicle are connected vehicles having communication units that enable them to send and receive wireless messages via one or more vehicular networks. In some embodiments, the recipient vehicle is a connected vehicle. In some embodiments, the ego vehicle and the remote connected vehicle include an onboard unit having an origin system stored therein.

Some of the embodiments described herein include a server. However, some of the embodiments described herein do not include a server. A serverless operating environment is an operating environment which includes at least one origin system and does not include a server.

In some embodiments, the origin system includes code and routines that are operable, when executed by a processor of the onboard unit, to cause the processor to execute one or more of the steps of the method 300 depicted in FIG. 3 or any other method described herein (e.g., the example general method).

This patent application is related to U.S. patent application Ser. No. 15/644,197 filed on Jul. 7, 2017 and entitled "Computation Service for Mobile Nodes in a Roadway Environment," the entirety of which is hereby incorporated by reference. This patent application is also related to U.S. patent application Ser. No. 16/457,612 filed on Jun. 28, 2019 and entitled "Context System for Providing Cyber Security for Connected Vehicles," the entirety of which is hereby incorporated by reference.

Example Overview

In some embodiments, the origin system is software that is operable, when executed by a processor, to cause the processor to execute one or more of the methods described herein. An example operating environment 100 for the origin system is depicted in FIG. 1.

In some embodiments, the origin system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. For example, the communication unit 145 includes a C-V2X radio. FIG. 1 depicts an example operating environment 100 for the origin system 199 according to some embodiments.

Example Operative Environment

Embodiments of the origin system are now described. Referring now to FIG. 1, depicted is a block diagram illustrating an operating environment 100 for an origin system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123") operated by a driver 109; a remote connected vehicle 124 (which has a driver too, which is not pictured, in embodiments where the remote connected vehicle 124 is not at least a Level III autonomous vehicle); a cloud server 103; and an edge server 198. These elements are communicatively coupled to one another via a network 105. These elements of the operating environment 100 are depicted by way of illustration. In practice, the operating environment 100 may include one or more of the elements depicted in FIG. 1. For example, although only two vehicles 123, 124 are depicted in FIG. 1, in practice the operating environment 100 can include a plurality of these elements.

The operating environment 100 also includes the roadway environment 140. The roadway environment 140 was described above, and that description will not be repeated here.

In some embodiments, one or more of the ego vehicle 123, the remote connected vehicle 124, and the network 105 are elements (e.g., members) of a vehicular micro cloud 194.

In some embodiments, the ego vehicle 123 and the remote connected vehicle 124 include similar elements. For example, each of these elements of the operating environment 100 include their own processor 125, bus 121, memory 127, communication unit 145, processor 125, sensor set 126, onboard unit 139, standard-compliant GPS unit 150, and origin system 199. These elements of the ego vehicle 123 and the remote connected vehicle 124 provide the same or similar functionality regardless of whether they are included in the ego vehicle 123 or the remote connected vehicle 124.

Accordingly, the descriptions of these elements will not be repeated in this description for each of the ego vehicle 123 and the remote connected vehicle 124.

In the depicted embodiment, the ego vehicle 123 and the remote connected vehicle 124 store similar digital data. The system data 129 includes digital data that describes some or all of the digital data stored in the memory 127 or otherwise described herein. The system data 129 is depicted in FIG. 1 as being an element of the cloud server 103, but in practice the system data 129 is stored on one or more of the server, the ego vehicle 123, and one or more of the remote connected vehicles 124.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. The vehicular micro cloud 194 is depicted with a dashed line in FIG. 1 to indicate that it is an optional element of the operating environment 100.

In some embodiments, the vehicular micro cloud 194 includes a stationary vehicular micro cloud or a mobile vehicular micro cloud. For example, each of the ego vehicle 123 and the remote connected vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963.

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

In some embodiments, the operating environment 100 includes a plurality of vehicular micro clouds 194. For example, the operating environment 100 includes a first vehicular micro cloud and a second vehicular micro cloud.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote connected vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

In some embodiments, the vehicular micro cloud 194 does not include a hardware server. Accordingly, in some embodiments the vehicular micro cloud 194 may be described as serverless.

In some embodiments, the vehicular micro cloud 194 includes a server. For example, in some embodiments the vehicular micro cloud 194 includes the cloud server 103.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

In some embodiments, the network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote connected vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote connected vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 includes a car, a truck, a sports utility vehicle, a bus, a semi-truck, a drone, or any other roadway-based conveyance. In some embodiments, the ego vehicle 123 includes an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers. In some embodiments, the vehicle control system 153 is an autonomous driving system.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153; a communication unit 145; an onboard unit 139; a memory 127; and an origin system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the origin system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS);

a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 is a roadway that includes a roadway region. The ego sensor data 195 may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the origin system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the origin system 199 provides its functionality as described herein with reference to the method 300 depicted in FIG. 3 and/or the example general method described herein.

In some embodiments, the sensor set 126 includes any sensors that are necessary to record ego sensor data 195 that describes the roadway environment 140 in sufficient detail to create a digital twin of the roadway environment 140. In some embodiments, the origin system 199 generates the set of nano clouds and assigns sub-tasks to the nano clouds based on the outcomes observed by the origin system 199 during the execution of a set of digital twins that simulate the real-life circumstances of the ego vehicle 123.

For example, in some embodiments the origin system 199 includes simulation software. The simulation software is any simulation software that is capable of simulating an execution of a vehicular micro cloud task. For example, the simulation software is operable simulate the origin system 199 providing its functionality to generate some or all of the system data 129. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the origin system 199. In some other embodiments, the simulation software is a standalone software that the origin system 199 can access to execute digital twin simulations to determine the best way to divide the vehicular micro cloud 194 into nano clouds and which sub-tasks to assign which nano clouds. The digital twin simulations may also be used by the origin system 199 to determine how to break down the vehicular micro cloud task into sub-tasks.

Digital twins, and an example process for generating and using digital twins which is implemented by the origin system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The ego sensor data 195 includes digital data that describes any measurement that is taken by one or more of the sensors of the sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote connected vehicle 124, the ego vehicle 123, or some other tangible object or construct located in a roadway environment 140) is now described according to some embodiments. In some embodiments, the origin system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the origin system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the origin system 199 to determine the lane of travel of the ego vehicle 123. This measurement improves the accuracy of the GPS data describing the location of lanes used by the ego vehicle 123 when the origin system 199 is providing its functionality.

In some embodiments, the memory 127 stores two types of GPS data. The first is GPS data of the ego vehicle 123 and the second is GPS data of one or more objects (e.g., the remote connected vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit 150 is a sensor included in the sensor set 126 and the GPS data is an example type of ego sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the origin system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the origin system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the ego sensor data 195; the threshold data 196; the member data 171; the digital twin data 162; the V2X data 133; the GPS data (as an element of the ego sensor data 195); the GUI data 187; the analysis data 181; the approved strategy data 182; the selected strategy data 186; the origin data 184; the profile data 183; the reference data 188; the remote sensor data 193; the time data 154; the ego sensor data 195; the time data 155; and the profile update data 172. The system data 129 includes some or all of this digital data. In some embodiments, the V2X messages (or C-V2X messages or the set of wireless messages) described herein are also stored in the memory 127. The above-described elements of the memory 127 were described above, and so, those descriptions will not be repeated here.

In some embodiments, the ego vehicle 123 includes a vehicle control system 153. A vehicle control system 153 includes one or more ADAS systems or an autonomous driving system. In some embodiments, the origin system 199 uses some or all of the payload of the set of wireless messages described herein as inputs to the vehicle control system 153 to improve the operation of the vehicle control system 153 by increasing the quantity of data it has access to when controlling the operation of the ego vehicle 123.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness origin system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the origin system 199 includes code and routines that are operable, when executed by the processor 125, to execute one or more steps of the example general method described herein. In some embodiments, the origin system 199 includes code and routines that are operable, when executed by the processor 125, to execute one or more steps of the method 300 described below with reference to FIG. 3.

Figure 2:
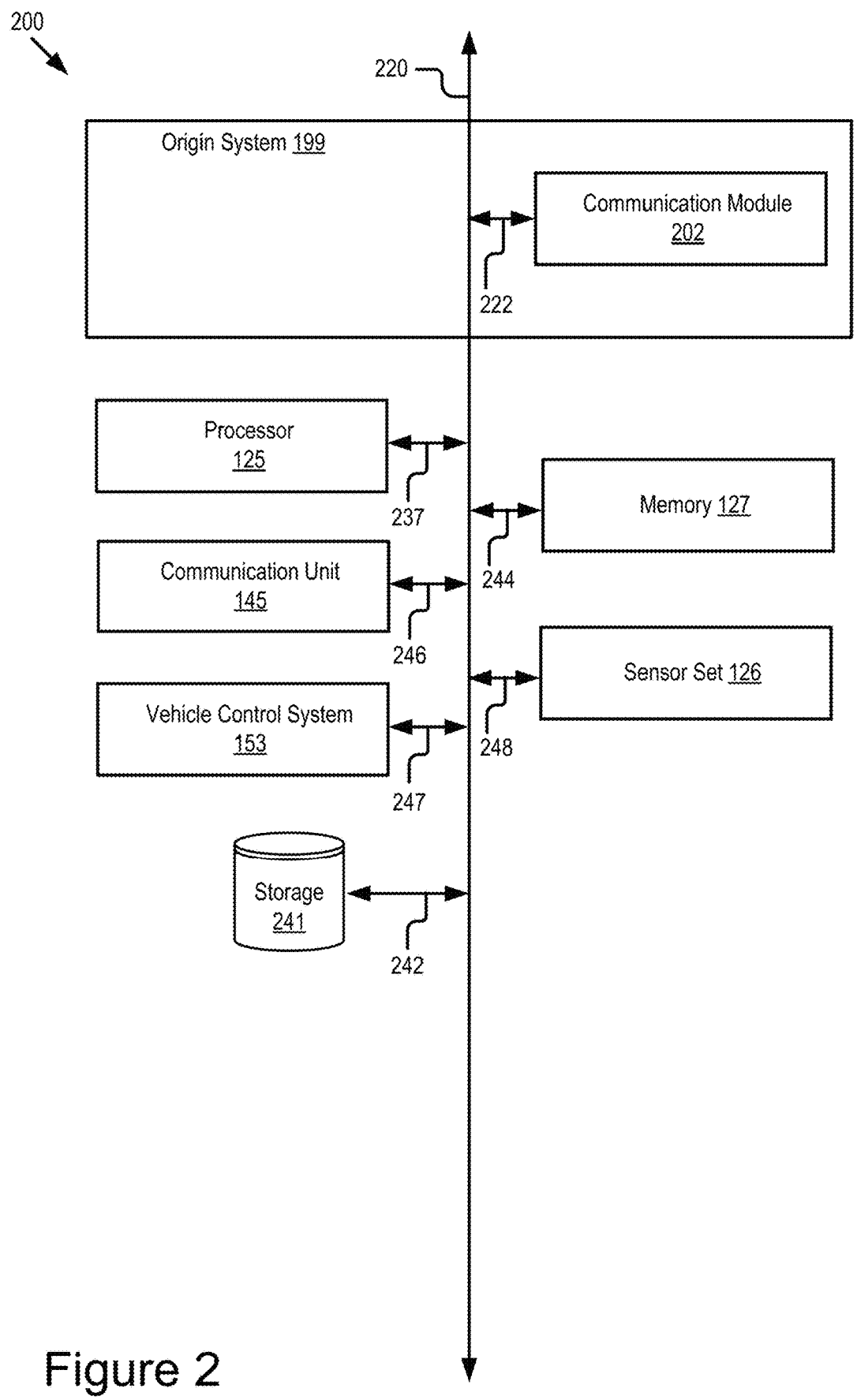
FIG. 2 is a block diagram illustrating an example computer system including an origin system according to some embodiments.

An example embodiment of the origin system 199 is depicted in FIG. 2. This embodiment is described in more detail below.

In some embodiments, the origin system 199 is an element of the onboard unit 139 or some other onboard vehicle computer. In some embodiments, the origin system 199 includes code and routines that are stored in the memory 127 and executed by the processor 125 or the onboard unit 139. In some embodiments, the origin system 199 is an element of an onboard unit of the ego vehicle 123 which executes the origin system 199 and controls the operation of the communication unit 145 of the ego vehicle 123 based at least in part on the output from executing the origin system 199.

In some embodiments, the origin system 199 is implemented using hardware including a field-programmable gate array ("FPGA") or an application-specific integrated circuit ("ASIC"). In some other embodiments, the origin system 199 is implemented using a combination of hardware and software.

In some embodiments, the origin system 199 is an element of the cloud server 103 and not an element of the ego vehicle 123 or any other vehicle such as the remote connected vehicle 124.

The remote connected vehicle 124 includes elements and functionality which are similar to those described above for the ego vehicle 123, and so, those descriptions will not be repeated here. In some embodiments, the ego vehicle 123 and the remote connected vehicle 124 are members of a vehicular micro cloud 194.

The roadway environment 140 is now described according to some embodiments. In some embodiments, some, or all of the ego vehicle 123 and the remote connected vehicle 124 (or a plurality of remote connected vehicles) are located in a roadway environment 140. In some embodiments, the roadway environment 140 includes one or more vehicular micro clouds 194. The roadway environment 140 is a portion of the real-world that includes a roadway, the ego vehicle 123 and the remote connected vehicle 124. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 197. The remote sensor data 197 includes digital data that describes the sensor measurements recorded by the sensor set 126 of the remote connected vehicle 124.

In some embodiments, the real-world includes the real of human experience comprising physical objects and excludes artificial environments and "virtual" worlds such as computer simulations.

In some embodiments, the roadway environment 140 includes a roadside unit that in includes an edge server 198. In some embodiments, the edge server 198 is a connected processor-based computing device that includes an instance of the origin system 199 and the other elements described above with reference to the ego vehicle 123 (e.g., a processor 125, a memory 127 storing the system data 129, a communication unit 145, etc.). In some embodiments, the roadway device is a member of the vehicular micro cloud 194.

In some embodiments, the edge server 198 includes one or more of the following: a hardware server; a personal computer; a laptop; a device such as a roadside unit; or any other processor-based connected device that is not a member of the vehicular micro cloud 194 and includes an instance of the origin system 199 and a non-transitory memory that stores some or all of the digital data that is stored by the memory 127 of the ego vehicle 123 or otherwise described herein. For example, the memory 127 stores the system data 129. The system data 129 includes some or all of the digital data depicted in FIG. 1 as being stored by the memory 127.

In some embodiments, the edge server 198 includes a backbone network. In some embodiments, the edge server 198 includes an instance of the origin system 199. The functionality of the origin system 199 is described above with reference to the ego vehicle 123, and so, that description will not be repeated here.

In some embodiments, the cloud server 103 one or more of the following: a hardware server; a personal computer; a laptop; a device such as a roadside unit; or any other processor-based connected device that is not a member of the vehicular micro cloud 194 and includes an instance of the origin system 199 and a non-transitory memory that stores some or all of the digital data that is stored by the memory 127 of the ego vehicle 123 or otherwise described herein. For example, the memory 127 stores the system data 129. In some embodiments, the cloud server 103 is operable to enable a driver 109 to provide their profile data 183 and/or approved strategy data 182, receive requests for profile data 183, respond to these requests with appropriate profile data 183 for a driver, receive requests to update profile data 183 with profile update data 172, and help an origin system 199 to implement a selected strategy. The cloud server 103 is operable to provide any other functionality described herein. For example, the cloud server 103 is operable to execute some or all of the steps of the methods described herein.

In some embodiments, the cloud server 103 includes a data structure 131. The data structure 131 includes a non-transitory memory that stores an organized set of digital data. For example, the data structure 131 includes an organized set of profile data 183 for a plurality of different drivers (e.g., the drivers of the ego vehicle 123 and the remote connected vehicle 124).

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote connected vehicle 124, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the origin system 199 includes encryption keys for encrypting wireless messages and decrypting the wireless messages described herein.

Referring now to FIG. 2, depicted is a block diagram illustrating an example computer system 200 including an origin system 199 according to some embodiments.

In some embodiments, the computer system 200 may include a special-purpose computer system that is programmed to perform one or more steps of one or more of the method 300 described herein with reference to FIG. 3 and the example general method described herein.

In some embodiments, the computer system 200 may include a processor-based computing device. For example, the computer system 200 may include an onboard vehicle computer system of the ego vehicle 123 or the remote connected vehicle 124.

The computer system 200 may include one or more of the following elements according to some examples: the origin system 199; a processor 125; a communication unit 145; a vehicle control system 153; a storage 241; and a memory 127. The components of the computer system 200 are communicatively coupled by a bus 220.

In some embodiments, the computer system 200 includes additional elements such as those depicted in FIG. 1 as elements of the origin system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the origin system 199 includes code and routines that are operable, when executed by the processor 125, to cause the processor 125 to execute one or more steps of the method 300 described herein with reference to FIG. 3. In some embodiments, the origin system 199 includes code and routines that are operable, when executed by the processor 125, to cause the processor 125 to execute one or more steps of the example general method.

In the illustrated embodiment shown in FIG. 2, the origin system 199 includes a communication module 202.

The communication module 202 can be software including routines for handling communications between the origin system 199 and other components of the computer system 200. In some embodiments, the communication module 202 can be a set of instructions executable by the processor 125 to provide the functionality described below for handling communications between the origin system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the origin system 199 and stores the data in one or more of the storage 241 and the memory 127.

In some embodiments, the communication module 202 may handle communications between components of the origin system 199 or the computer system 200.

Referring now to FIG. 3, depicted is a flowchart of an example method 300. The method 300 includes step 305, step 310, step 315, and step 320 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

The existing solutions do not determine the origin of abnormal driving behavior and implement strategies to reduce, minimize, or eliminate the origin so that the abnormal driving behavior does not occur in the future.

The existing solutions do not utilize vehicular micro clouds to implement a Service. The existing solutions also do not use digital twin simulations or other methods described herein to determine origin data and or selected strategy data.

The existing references also do not describe vehicular micro clouds as described herein. Some of the existing solutions require the use of vehicle platooning. A platoon is not a vehicular micro cloud and does not provide the benefits of a vehicular micro cloud, and some embodiments of the origin system that require a vehicular micro cloud. For example, among various differences between a platoon and a vehicular micro cloud, a platoon does not include a hub or a vehicle that provides the functionality of a hub vehicle. By comparison, in some embodiments the origin system includes codes and routines that are operable, when executed by a processor, to cause the processor to utilize vehicular micro clouds to resolve version differences among common vehicle applications installed in different connected vehicles.

Referring now to FIG. 4, depicted is a block diagram of a happens-before analysis 400 for a first use case according to some embodiments.

In the first use case either the ego vehicle 123 itself or nearby remote connected vehicles 124A, 124B, 124C (i.e., those that are in sensor detection range of the ego vehicle 123) detect abnormal driving behavior (e.g., swerving) by the ego vehicle 123 which is operated by a driver named Ava.

A naïve approach to solving this problem can be measuring the lane centering property of Ava. When the lane centering measurement deviates a lot, the system can conclude that Ava gets distracted. The origin system does not operate in this manner. Instead of correcting the abnormal driving behavior directly, the origin system determines the origin of the abnormal driving behavior and selects a strategy that reduces, minimizes, or removes the origin from future driving experiences of the driver so that the abnormal driving behavior does not occur for the same reason so that in the future.

In some embodiments, $\Delta t$ can be a value which is predefined according to type of unsafe driving behavior. For example, our research indicates that driver distraction generally happens in couple of seconds. Our research indicates that setting $\Delta t$ to 5-10 seconds will reveal the origin/cause behind the distraction. In some embodiments, $\Delta t$ can be dynamically set a value according to driver behavior and/or current traffic condition.

Referring now to FIG. 5, depicted is a block diagram of a cause-and-effect analysis 500 for the first use case according to some embodiments.

The origin system of the ego vehicle 123 executes a happens-before relationship analysis and cause-and-effect analysis to infer the origin of Ava's abnormal driving behavior.

FIG. 5 is a continuation of the analysis of the first use case by the origin system introduced with FIG. 4. Accordingly, FIGS. 4 and 5 can be read together for a more complete understanding of the analysis provided by the origin system in some embodiments. After executing the happens-before relationship analysis depicted in FIG. 4, the origin system executes a cause-and-effect analysis as depicted in FIG. 5 according to some embodiments. In this analysis the origin system causes the processor to execute code and routines that are configured to determine the origin of the abnormal driving behavior (e.g., Ava's distracted driving behavior) through cause-and-effect analysis.

The origin system includes code and routines that are operable, when executed by the processor, to cause the processor to execute one or more of the following steps: includes one or more of the following steps: (1) analyzing the happens-before relationship diagram described by the analysis data by grouping the factor data chronologically in groups of one-by-one (e.g., one factor by one factor), two-by-two (e.g., two factors by two factors), and N-by-N; (2) analyzing the groups of factors in chronological order relative to one another to determine which factors precipitated one another (e.g., determining the cause-and-effect relationships among the factors relative to one another chronologically), including, or in some embodiments with exclusive emphasis on, the factors that precipitated the abnormal driving behavior at time "T"; (3) constructing one or more cause-and-effect diagrams based at least in part on the on the analysis of step 2; (4) analyzing the cause-and-effect diagrams to determine the origin of the abnormal driving behavior diagram; and (5) outputting origin data describing the origin of the abnormal driving behavior.

Here, in this example the origin system causes the processor to group the factors one-by-one and a retrieve the set of time "Δt" used in the happens-before relationship analysis depicted in FIG. 4, which in this example was 5 seconds before the time "T." In step 4 above, this analysis includes, in some embodiments, the origin system analyzing Ava's driving history (which is an element of the historical data) to determine if Ava has demonstrated abnormal driving behavior at this same location in the past under the same factors found in the time range defined by "T-Δt." In this way, the factors behind Ava's the abnormal driving behavior are analyzed to determine a chain of cause-and-effect relationships that chronologically lead to the abnormal driving behavior. For example, beginning at the abnormal driving behavior, the origin system works backwards in time to construct a cause-and-effect chain that terminates at a factor (or a set of factors) which has no other factor which caused it; this factor is the terminal end of the cause-and-effect chain. The terminal end of this chain that is opposite the abnormal driving behavior is determined by the origin system to be the origin of the abnormal driving behavior. The origin data includes digital data that describes the set of factors (e.g., one or more factors) that is at this terminal end of the cause-and-effect chain. The analysis data includes digital data that describes this cause-and-effect chain. In some embodiments, this analysis data and the origin data are shared with the cloud server and/or the edge server via V2X communications initiated by the origin system to transmit a V2X message whose V2X data includes this analysis data and the origin data.

The origin system selects a strategy from the pre-approved strategies which is known to reduce, minimize, or eliminate the factor which was the origin of the abnormal driving behavior sufficient so that the abnormal driving behavior does not reoccur in the future because of this same set of factors.

For example, in the example depicted in FIG. 5 the origin of Ava's distracted driving is that she becomes a distracted driver whenever the following set of factors is present: Ava receives a phone call; Ava talks on her phone; and Ava is driving at a speed that exceeds 55 miles per hour. The selected strategy is, in this example, the following: the origin system controls an ADAS systems of the ego vehicle to slow down the speed of Ava's vehicle below 55 miles per hour. Another possible selected strategy is that, if Ava's phone is connected to the ego vehicle's infotainment system via Bluetooth or USB, then the origin system detects phone calls that are received by Ava's phone and diverts them to a voicemail system so that Ava is not aware that she received the phone call.

Figure 6:
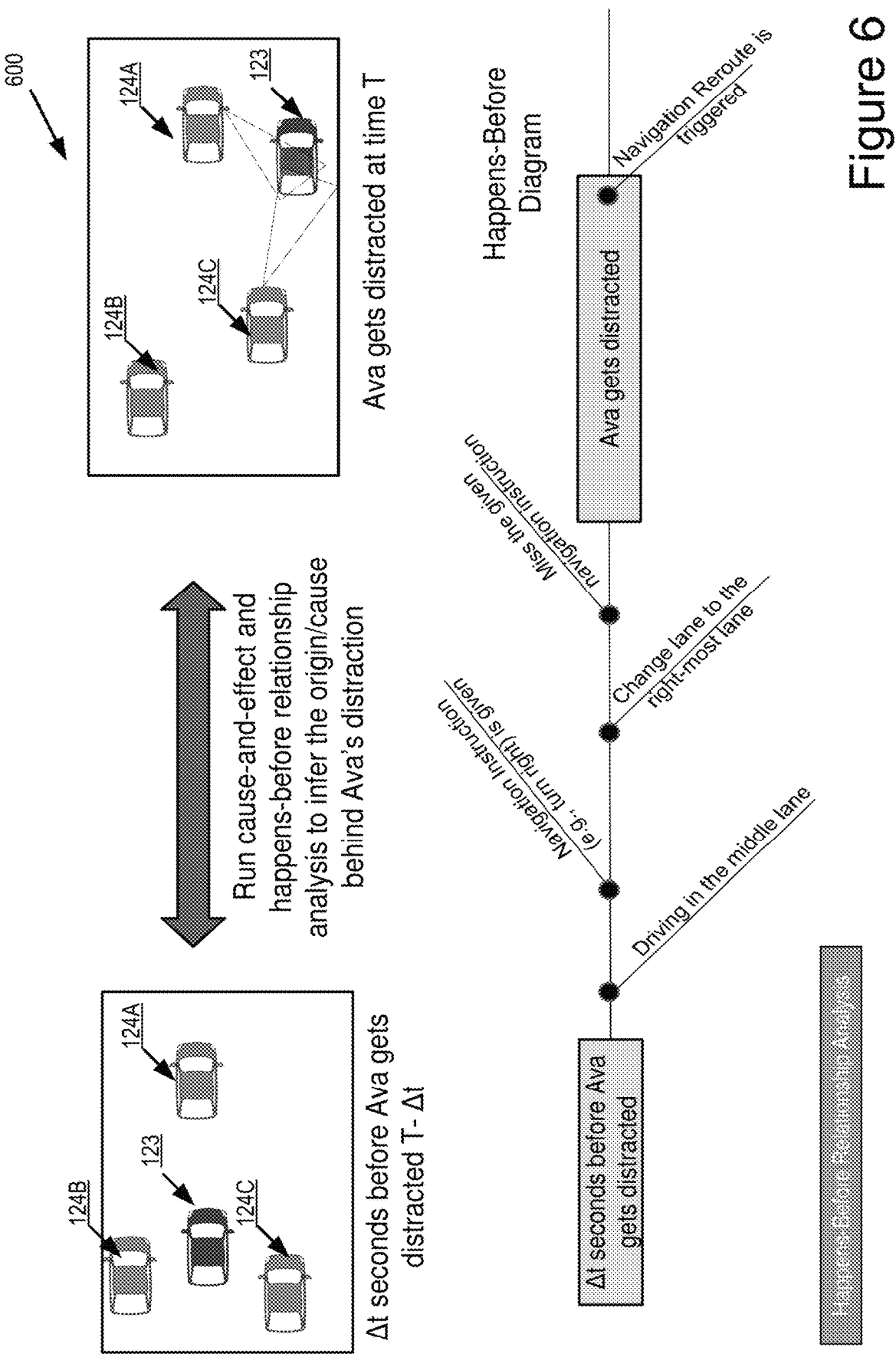
FIG. 6 is a block diagram of a happens-before analysis for a second use case according to some embodiments.

Referring now to FIG. 6, depicted is a block diagram of a happens-before analysis 600 for a second use case according to some embodiments. The origin system, when executed by the processor, causes the processor to execute a happens-before relationship analysis and generate the happens-before relationship diagram depicted in FIG. 6. This diagram is described by the analysis data that is outputted by the happens-before relationship analysis.

Referring now to FIG. 7, depicted is a block diagram of a cause-and-effect analysis 700 for the second use case according to some embodiments. FIG. 7 is a continuation of the analysis of the second use case by the origin system introduced with FIG. 6. Accordingly, FIGS. 6 and 7 can be read together for a more complete understanding of the analysis provided by the origin system in some embodiments.

The origin system, when executed by the processor, causes the processor to execute a cause-and-effect analysis and conclude that missing navigation instruction followed by the new navigation suggestion makes Ava drive abnormally like a distracted driver. The cause-and-effect chain indicates that the origin of Ava's abnormal driving behavior is navigation confusion.

When selecting a strategy, the origin system focuses on the origin behind Ava's abnormal driving behavior and generates to reduce, minimize, or completely remove the origin of Ava's abnormal driving behavior so that Ava does not demonstrate this same abnormal driving behavior in the future under similar factors.

The origin system determines that Ava gets distracted when she misses a navigation instruction given by the ego vehicles navigation system and the navigation system re-routes her trip. The origin system determines that the selected strategy is to modify the operation of the navigation system so that it provides Ava with micro-level navigation instructions so that Ava is less likely to miss a navigation instruction or become confused by her navigation instructions, thereby completely removing the origin of Ava's abnormal driving behavior.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

An origin system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the origin system to become coupled to other origin systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for identifying an origin of abnormal driving behavior for improved vehicle operation, the method comprising:
    identifying an abnormal driving behavior of a driver of a vehicle at a time T;
    identifying a set of events that occurred within a predetermined time Δt before time T;
    chronologically ordering the set of events to construct a happens-before relationship diagram that describes a chronological order of the set of events that leads to the abnormal driving behavior;
    executing a cause-and-effect analysis on the set of events to determine one or more events from the set of events that caused the abnormal driving behavior, wherein the cause-and-effect analysis includes analyzing the happens-before relationship diagram to determine the origin that caused the abnormal driving behavior, wherein the cause-and-effect analysis is executed by onboard vehicle computers of one or more vehicles that are members of a vehicular micro cloud; and
    executing a strategy by the vehicular micro cloud to reduce the abnormal driving behavior so that vehicle operation is improved, wherein the strategy is selected from a set of pre-approved strategies based on the execution of a set of digital twin simulations.

2. The method of claim 1, wherein the set of digital twin simulations identify one or more factors that precipitated the abnormal driving behavior.

3. The method of claim 1, wherein the abnormal driving behavior is identified based at least in part on the execution of a set of digital twin simulations.

4. The method of claim 1, wherein the strategy is operable to correct the abnormal driving behavior.

5. The method of claim 4, wherein the vehicular micro cloud does not include use of cellular communications.

6. The method of claim 1, wherein the strategy is executed by a vehicle control system of the vehicle.

7. The method of claim 1, wherein the method is executed at least in part by a hardware server.

8. The method of claim 1, wherein the strategy is executed by a plurality of vehicle control systems of a plurality of vehicles that are members of a vehicular micro cloud.

9. The method of claim 8, wherein the vehicular micro cloud is formed responsive to identifying the abnormal driving behavior by the method.

10. The method of claim 1, wherein the strategy is selected based on a type of the abnormal driving behavior so that the strategy is customized for the type.

11. The method of claim 10, wherein the set of pre-approved strategies is pre-approved by the driver of the vehicle.

12. The method of claim 10, wherein the set of pre-approved strategies is pre-approved by an engineer of the vehicle.

13. The method of claim 12, wherein the pre-approval occurs prior to the driver operating the vehicle.

14. The method of claim 12, wherein the pre-approval is stored in a trip profile which the driver creates each time they operate the vehicle.

15. The method of claim 12, wherein the pre-approval is stored in a user profile associated with the driver and the user profile is accessible via a plurality of vehicles so that the user profile of the driver is usable by the driver when operating any of the plurality of vehicles.

16. A system comprising:
a non-transitory memory;
a vehicle control system;
and a processor communicatively coupled to the non-transitory memory and the vehicle control system, wherein the non-transitory memory stores computer readable code that is operable, when executed by the processor, to cause the processor to execute steps including:
identifying an abnormal driving behavior of a driver of a vehicle at a time T;
identifying a set of events that occurred within a predetermined time Δt before time T;
chronologically ordering the set of events to construct a happens-before relationship diagram that describes a chronological order of the set of events that leads to the abnormal driving behavior;
executing a cause-and-effect analysis on the set of events to determine one or more events from the set of events that caused the abnormal driving behavior, wherein the cause-and-effect analysis includes analyzing the happens-before relationship diagram to determine an origin that caused the abnormal driving behavior, wherein the cause-and-effect analysis is executed by onboard vehicle computers of one or more vehicles that are members of a vehicular micro cloud; and
executing a strategy, by the vehicular micro cloud, to reduce the abnormal driving behavior so that vehicle operation is improved, wherein the strategy is selected from a set of pre-approved strategies based on the execution of a set of digital twin simulations.

17. The system of claim 16, wherein the strategy is selected from a set of pre-approved strategies based on a type of the abnormal driving behavior so that the strategy is customized for the type.

18. The system of claim 17, wherein the set of pre-approved strategies is pre-approved by the driver of the vehicle.

19. The system of claim 18, wherein the pre-approval occurs while to the vehicle is not moving but the driver is operating the vehicle.

20. A computer program product including computer code stored on a non-transitory memory that is operable, when executed by an onboard vehicle computer of a vehicle, to cause the onboard vehicle computer to execute operations including:
identifying an abnormal driving behavior of a driver of a vehicle at a time T;
identifying a set of events that occurred within a predetermined time Δt before time T;
chronologically ordering the set of events to construct a happens-before relationship diagram that describes a chronological order of the set of events that leads to the abnormal driving behavior
executing a cause-and-effect analysis on the set of events to determine one or more events from the set of events that caused the abnormal driving behavior, wherein the cause-and-effect analysis includes analyzing the happens-before relationship diagram to determine an origin that caused the abnormal driving behavior, wherein the cause-and-effect analysis is executed by onboard vehicle computers of one or more vehicles that are members of a vehicular micro cloud; and
executing a strategy by the vehicular micro cloud to reduce the abnormal driving behavior so that vehicle operation is improved, wherein the strategy is selected from a set of pre-approved strategies based on the execution of a set of digital twin simulations.

* * * * *